United States Patent
O'Halloran et al.

(10) Patent No.: US 11,455,320 B2
(45) Date of Patent: Sep. 27, 2022

(54) AUTOMATED EXPANSION AND REDUCTION OF REPLICATED DATA SETS

(71) Applicant: EMC IP Holding Company LLC, Hopkinton, MA (US)

(72) Inventors: Brian O'Halloran, Carrigaline (IE); Siobhan McLoughlin, Crookstown (IE); Peter Fleming, Fermoy (IE); Martin Neville, Kerry (IE); Brid O'Driscoll, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 17/007,387

(22) Filed: Aug. 31, 2020

(65) Prior Publication Data

US 2022/0067060 A1    Mar. 3, 2022

(51) Int. Cl.
    *G06F 16/27*    (2019.01)
(52) U.S. Cl.
    CPC .................................. *G06F 16/27* (2019.01)
(58) Field of Classification Search
    CPC .......................................................... G06F 16/27
    USPC ....................................................... 707/634
    See application file for complete search history.

(56) References Cited

U.S. PATENT DOCUMENTS

| | | |
|---|---|---|
| 5,544,347 A | 8/1996 | Yanai et al. |
| 5,742,792 A | 4/1998 | Yanai et al. |
| 6,968,369 B2 | 11/2005 | Veprinsky et al. |
| 7,054,883 B2 | 5/2006 | Meiri et al. |
| 2018/0314430 A1* | 11/2018 | George .................. G06F 3/0619 |
| 2019/0245918 A1* | 8/2019 | Xu ....................... H04L 67/1002 |

OTHER PUBLICATIONS

DellEMC, "Dell EMC SRDF," Rev 01, Sep. 2019.
DellEMC, "Dell EMC PowerMax and VMAX All Flash: SRDF/Metro Overview and Best Practices," Sep. 2019.

* cited by examiner

*Primary Examiner* — Michael Pham
(74) *Attorney, Agent, or Firm* — Muirhead and Saturnelli, LLC

(57) ABSTRACT

Techniques for modifying an application data set may include receiving a request to modify a storage group of logical devices used by an application; and performing processing that modifies, in accordance with the request, the storage group and an existing remote replication configuration. The processing may include verifying that the logical devices of the storage group are protected by remote replication performed in accordance with the existing remote replication configuration; analyzing the existing remote replication configuration and generating analysis information; performing, in accordance with the analysis information and the request, a first modification to the existing remote replication configuration; and performing, in accordance with the request, a second modification to the storage group. The request may add logical devices to the storage group or remove logical devices from the storage group and accordingly modify the existing remote replication configuration.

16 Claims, 12 Drawing Sheets

AUTOMATED EXPANSION AND REDUCTION OF REPLICATED DATA SETS

BACKGROUND

Technical Field

This application generally relates to data storage and data replication.

Description of Related Art

Data storage systems may include resources used by one or more host systems. The data storage systems and the host systems may be interconnected by one or more communication connections such as in a network. The resources may include, for example, data storage devices such as those included in the data storage systems. The data storage systems may be coupled to the one or more host systems where the data storage systems provide storage services to each host system.

The host systems may store data to, retrieve data from, a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system. The data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Various embodiments of the techniques herein may include a method, a system and a computer readable medium for modifying an application data set comprising: receiving a request to modify a storage group of one or more logical devices used by an application; and performing first processing that modifies, in accordance with the request, the storage group and an existing remote replication configuration, wherein the first processing includes: verifying that the one or more logical devices of the storage group are protected by remote replication performed in accordance with the existing remote replication configuration; analyzing the existing remote replication configuration and generating analysis information; performing, in accordance with the analysis information and the request, a first modification to the existing remote replication configuration; and performing, in accordance with the request, a second modification to the storage group.

In at least one embodiment, the storage group may be included in a first data storage system and the existing remote replication configuration may be used in connection with remotely replicating the one or more logical devices of the storage group on a second data storage system including a second storage group of the one or more logical devices. The storage group and the second storage group may be included in a first replication group. The first replication group may include one or more remote replication device pairs each including one logical device from the storage group and a corresponding logical device from the second storage group. The corresponding logical device of the second storage group of the second data storage system may be configured as a remote replica of the one logical device of the storage group of the first data storage system.

In at least one embodiment, the request may specify to add a first logical device to the storage group. Analyzing may determine a first replication mode and a first replication pair state of the one or more remote replication device pairs of the first replication group. The first modification may include configuring a new remote replication device pair of the first replication group for the first logical device, and wherein the new remote replication device pair may be configured to have the first replication mode and the first replication pair state. The second modification may include adding the first logical device to the storage group.

In at least one embodiment, verifying that the one or more logical devices of the storage group are protected by remote replication performed in accordance with the existing remote replication configuration may further include: determining that all logical devices of the storage group are included in a same replication group, the first replication group; determining that all logical devices of the storage group have a same associated replication pair state; and determining that the first replication group is online and that the second data storage system is visible to the first data storage system.

In at least one embodiment, analyzing may determine that the existing remote replication configuration includes a plurality of replication hops, where each of the plurality of replication hops denotes a remote replication configuration between two data storage systems, wherein each of the plurality of replication hops is associated with a corresponding one of a plurality of replication groups identifying remote replication devices pairs for said each replication hop, and wherein the plurality of replication hops includes a first replication hop associated with the first replication group. Each of the plurality of replication groups may identify logical devices of one data storage system remotely replicated on corresponding logical devices of another data storage system. The first processing may include: verifying that all logical devices of the plurality of replication groups are protected by remote replication performed in accordance with the existing remote replication configuration; for each of the plurality of replication groups associated with one of the plurality of replication hops, determining that remote replication device pairs of the said each replication group have a same associated replication pair state; and determining that each of the plurality of replication groups is online and that all remote data storage systems associated with the plurality of replication hops are visible to the first data storage system.

In at least one embodiment, the request may specify to remove a first logical device from the storage group. Analyzing may determine a first replication mode and a first replication pair state of the one or more remote replication device pairs of the first replication group. The first modification may include removing a first remote replication device pair from the first replication group for the first logical device. The second modification may include removing the first logical device from the storage group.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
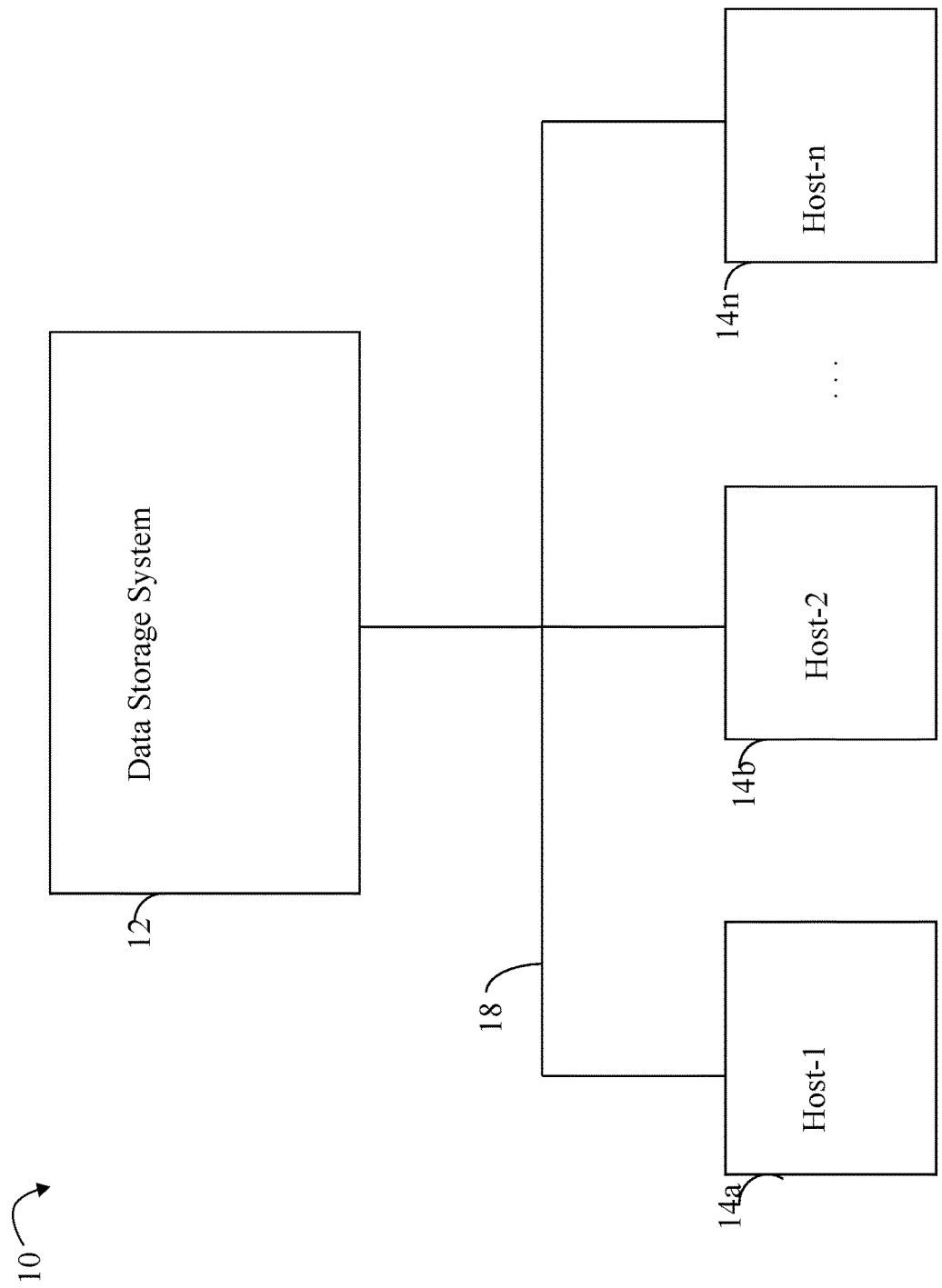
FIG. 1 is an example of an embodiment of components that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), as well as, more generally, any suitable file-based protocol or block-based protocol. Some or all of the connections by which the hosts and the data storage system 12 may be connected to the communication medium 18 may pass through other communication devices and equipment, such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation, such as an I/O operation, resulting in one or more data requests to the data storage system 12. It should be noted that the data storage system 12 of FIG. 1 may physically be a single data storage system, such as a single data storage array, as well one or more other data storage systems as may vary with the embodiment.

Figure 2A:
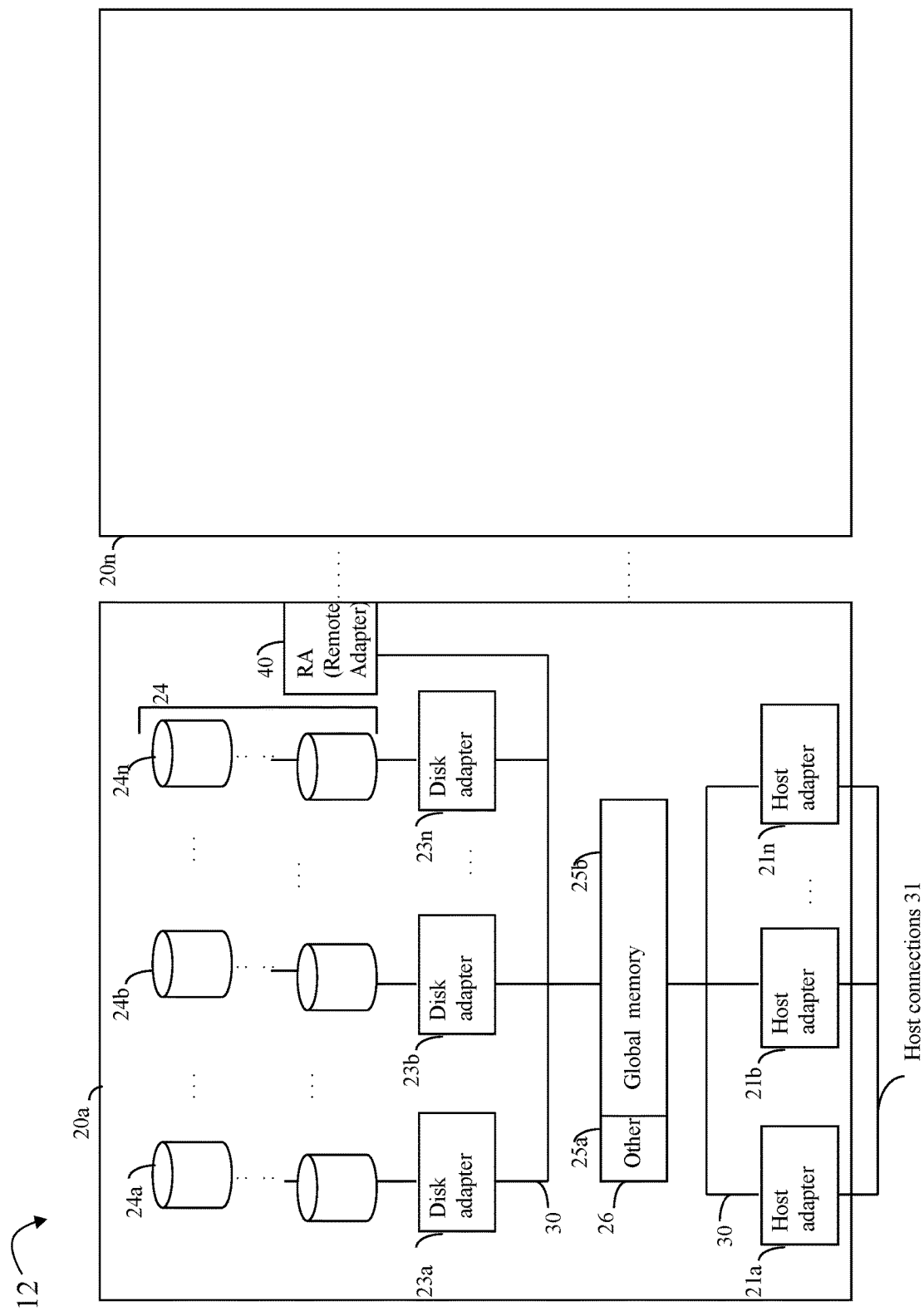
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of the element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the backend physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs, RAs and the like, as described herein. Components of the data storage system, such as an HA, which may communicate with a host and receive host data requests such as I/O operations, may also be referred to as front end components. A DA may be characterized as a backend component of the data storage system. In connection with the data storage systems, various types of directors or adapters may be implemented as a processor, or, more generally, a component that includes one or more processors or processing cores. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with the techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
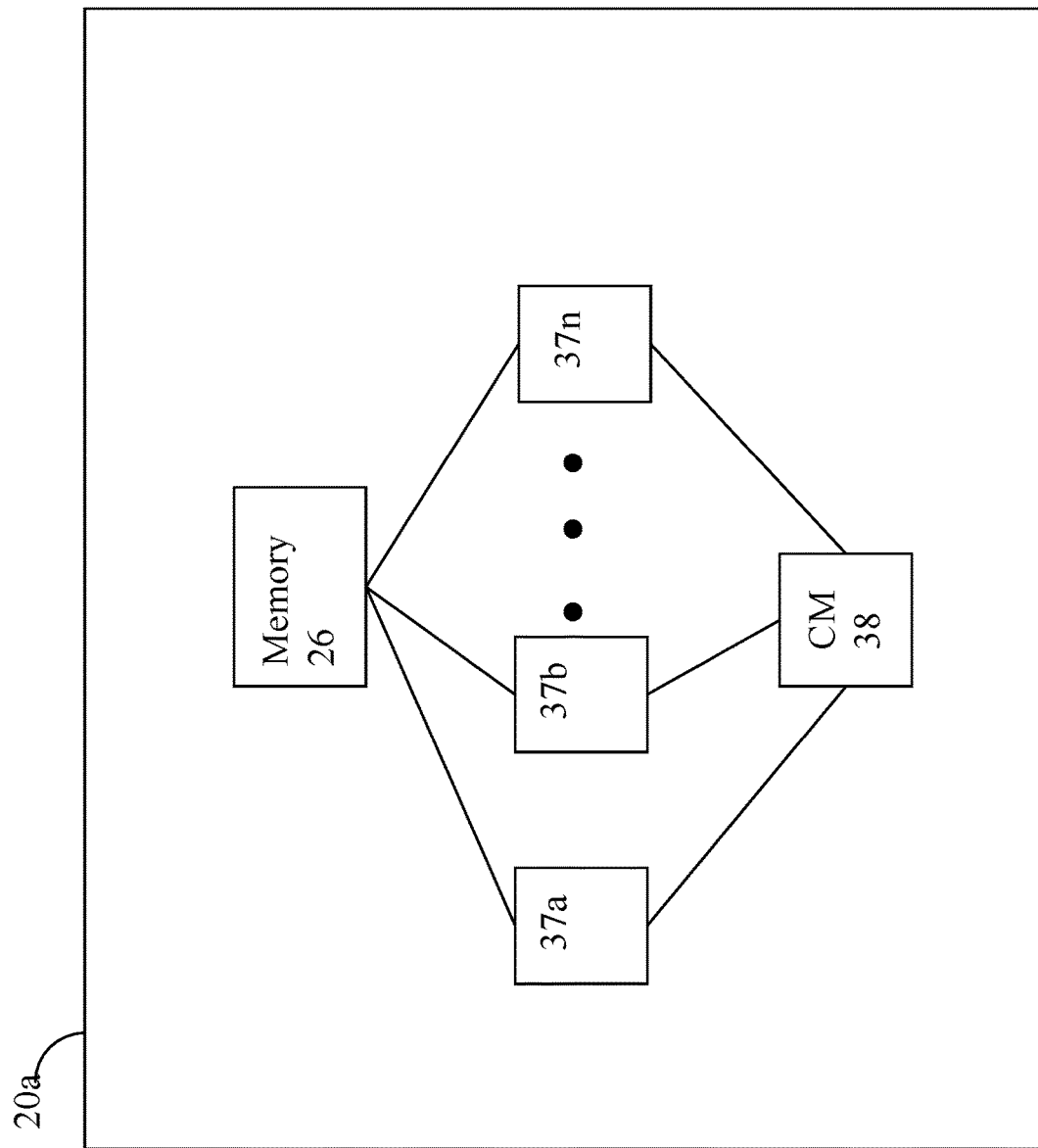
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with the techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with the techniques herein, the data storage system as described may be characterized as having one or more logical mapping layers in which a logical device of the data storage system is exposed to the host, whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, the control commands may be issued from data storage management software executing on a management system or console in communication with the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, a data storage system may have a separate physical connection from the management system or console to the data storage system 12 being managed whereby control commands may be issued over such a physical connection. However, it may be that user I/O commands are never issued over such a physical connection provided solely for purposes of connecting the management system to the data storage system. In any case, the data path and control path each define two separate logical flow paths.

With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet, Fibre Channel, or other suitable transmission channel supporting messaging traffic between data storage systems. The RA may be hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one data storage system to the other in accordance with a particular replication mode, such as a synchronous or an asynchronous mode described elsewhere herein. Generally, the Dell EMC™ SRDF® products are one example of commercially available products that may be used to provide functionality of a remote data facility (RDF) for use in an embodiment in connection with the techniques herein.

Remote replication is one technique that may be used in connection with providing for disaster recovery (DR) of an application's data set. The application, such as executing on a host, may write to a production or primary data set of one or more LUNs on a primary data storage system. Remote replication, such as using RDF, may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system.

Over time, the application's data set of LUNs may be expanded or reduced to accommodate the changing data needs and uses of the application. For example, a LUN may be added to the application data set as the size of the data set increases over time. As another example, an existing LUN of the application data set may be removed, for example, if the data of the existing LUN is no longer used by the application. In order to provide full protection of the application's data set as part of DR, changes to remote replication of the data set of LUNs are also needed as the particular LUNs in the data set change over time.

Currently, performing the needed changes with respect to remote replication of a data set as LUNs are added and/or removed from the data set is a complex process. When expanding the application data set by adding one or more LUNs to an existing data set, failure to provide full protection using remote replication for the newly added LUNs as part of DR may result in a partially protected data set. Such partially protected data sets typically do not allow the application to continue full normal operations in the event of a disaster of the primary copy of the data set. When reducing an existing data set such as by removing one or more LUNs, failure to make corresponding changes to remote replication results in unnecessary consumption of system and network resources. For example, if a LUN of a data set or removed without removing the LUN's corresponding remote replication storage relationships, resources are unnecessarily consumed and thus unavailable for other uses.

Described in the following paragraphs are techniques that may be used in connection with automation and orchestration of the processing performed to provide full protection of a data set of an application. The techniques may be performed responsive to modifying the existing data set of LUNs, where the modification includes expanding the existing data set such as by adding one or more LUNs to the existing data set. The techniques may be performed responsive to modifying the existing data set of LUNs, where the modification includes reducing the existing data set such as by removing one or more LUNs of the existing data set. The techniques may include analyzing the current replication configuration of the existing data set and orchestrating the steps to add any new LUNs added to the data set and/or remove any specified LUNs from the data set. The techniques also include performing steps that modify the existing replication setup and configuration to establish remote replication of the newly added LUNs and also remove the remote replication of the LUNs removed from the data set. In at least one embodiment, providing for full protection for DR of a data set using remote replication includes performing a sequence of tasks performed in a specified order. In such an embodiment, the order in which the steps are performed maintains the manageability of storage entities in the event of a failure of an action involved in the processing performed in connection with the techniques herein for the data set expansion or reduction.

The foregoing and other details of the techniques herein providing for automated expansion and reduction of remotely replication data sets are described in following paragraphs.

Prior to discussing the techniques herein that provide automated expansion and reduction of remotely replication data sets, the following paragraphs initially provide a more detailed description of a RDF that may be used to automatically perform remote data replication in an embodiment in accordance with the techniques herein. Additionally, the following paragraphs also provide some example remote replication configurations that may be used in an embodiment in accordance with the techniques herein.

Figure 3:
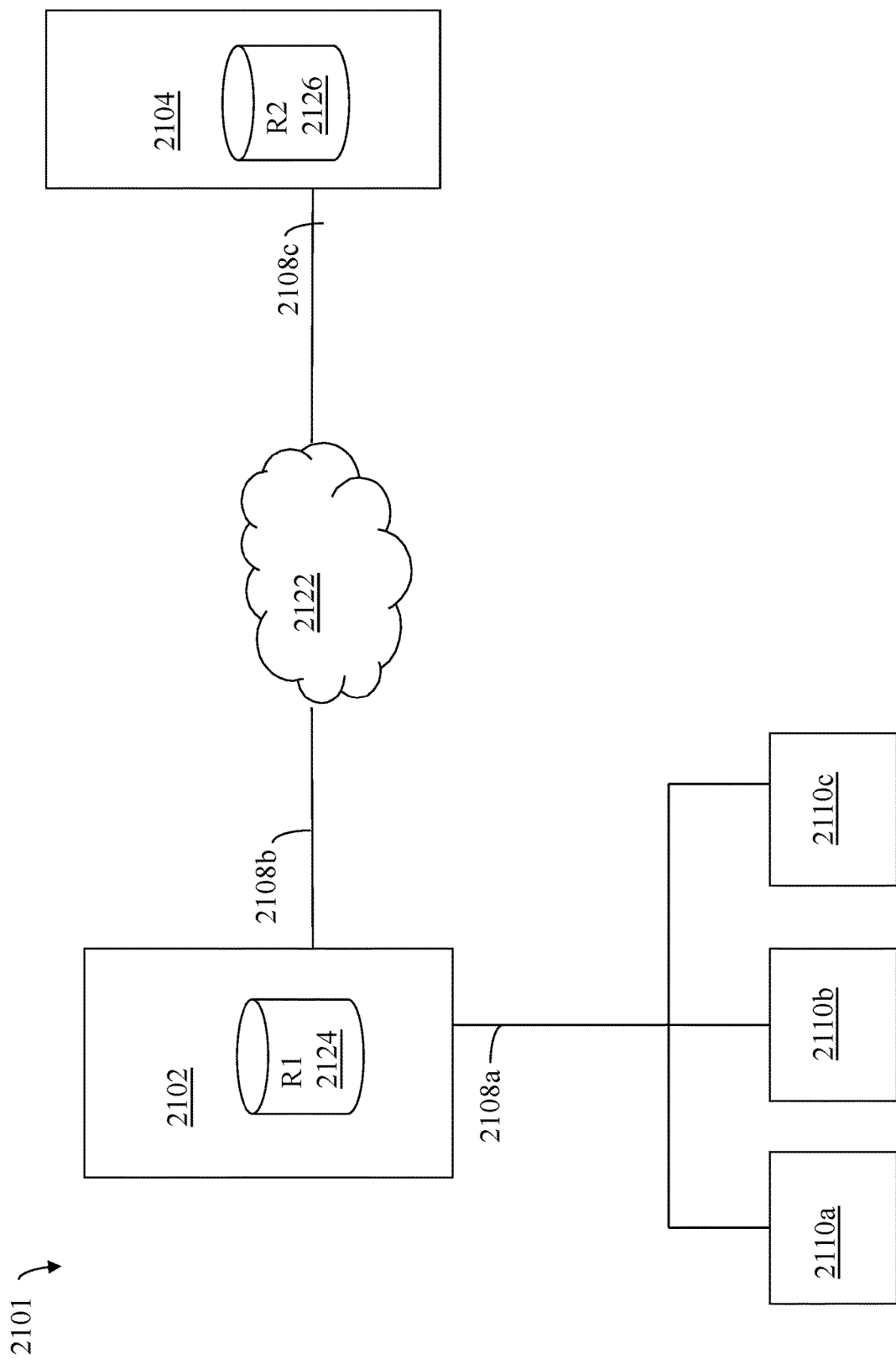
FIGS. 3, 4, 5, 6, 7 and 8 are examples of various replication configurations that may be used in an embodiment in accordance with the techniques herein.

Referring to FIG. 3, shown is an example of an embodiment of a system 2101 that may be used in connection with the techniques described herein. It should be noted that the illustrated in FIGS. 1 and 2A, for example, including only some detail of the data storage systems 12 for the sake of illustration.

Included in the example 2101 are the data storage systems 2102 and 2104; and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection. Although not illustrated, the hosts 2110a-2110c may also be directly connected to a network such as the Internet.

The data storage systems 2102 and 2104 may include one or more devices. In this example, the data storage system 2102 includes the storage device R1 2124, and the data storage system 104 includes the storage device R2 2126. Both of the data storage systems may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Dell EMC™ SRDF® products. Communication between the data storage systems providing remote replication using Dell EMC™ SRDF® is described, for example, in U.S. Pat. Nos. 5,742,792, 5,544, 347, and 7,054,883, all of which are incorporated by reference herein. With Dell EMC™ SRDF®, a user may denote a first storage device, such as R1, as a primary storage device and a second storage device, such as R2, as a secondary storage device. Other incarnations of Dell EMC™ SRDF® may provide a peer to peer relationship between the local and remote storage devices. In this example, the host 2110a interacts directly with the device R1 of the data storage system 2102, and any data changes made are automatically provided to the R2 device of the data storage system 2104 using Dell EMC™ SRDF®. In operation, the host 110a may read and write data using the R1 volume in 2102, and Dell EMC™ SRDF® may handle the automatic copying and updating of data from R1 to R2 in the data storage system 2104.

As illustrated in connection with other figures herein, the data storage system 2102 may have one or more RAs included therein to facilitate remote connections to the data storage system 2104. Communications between the storage systems 2102 and 2104 may be made over connections 2108b, 2108c to the network 2122. The data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group (also referred to as a replication group) of devices (e.g., LUNs). Rather than have a single R1 device and a single R2 device, a replication group may be defined includes a source group of devices, such as devices of the data storage system 2102, and includes a corresponding target group of devices, such as devices on data storage system 2104. The devices in the source group may be mirrored in corresponding devices of the target group using Dell EMC™ SRDF® functionality.

In at least one embodiment, storage groups (SGs) may be supported. A SG may be a logically defined group of one or more LUNs, or more generally devices, in a data storage system. In connection with RDF, a source SG may be defined on the primary or R1 data storage system where the source SG includes one or more LUNs used by an application. The source SG may include the R1 devices of the R1-R2 device pairings used in connection with RDF. A target SG may be defined on the secondary or R2 data storage system where the target SG includes a corresponding replica for each LUN in the source SG. Each LUN in the source SG is uniquely paired with a corresponding LUN in the target SG, where the corresponding LUN is a replica of associated LUN from the source SG. The target SG may include the R2 devices of the R1-R2 RDF device pairings used in connection with RDF. Collectively, the R1-R2 RDF device pairs represented by the source SG and its corresponding target SG of device replicas may be referred to as a replication group. To further illustrate, assume the source SG includes LUN A1 and LUN B1 and the target SG includes LUN A2 and LUN B2, where LUN A1 and LUN A2 are configured as a first RDF device pairing (e.g., LUN A1 is the R1 device of the first RDF pairing and LUN A2 is the R2 device of the first RDF pairing), and where LUN B1 and LUN B2 are configured as a second RDF pairing (e.g., LUN B1 is the R1 device of the RDF pairing and LUN B2 is the R2 device of the second RDF pairing).

In at least one embodiment, LUNs may not be accessible or exposed to a host or other client until the LUN is included in a particular SG. In such an embodiment, access controls may be used to selectively allow access to the LUNs of the SG. For example, a first host may be permitted to access LUNs of a first SG but not LUNs of a second different SG. In this manner, the data storage system may, for example, selectively expose LUNs of a first set of SGs to a first set of hosts and also not allow other hosts to access of the first set SGs of LUNs.

Discussion herein may refer to examples using an RDF device pairing with a single R1 device paired with a single R2 device. However, more generally, the same concepts described herein with respect to a single RDF device pairing also applies to the multiple RDF device pairings of a replication group.

The techniques herein may be used with Dell EMC™ SRDF®, or more generally any RDF, operating in one or more different supported replication modes. For example, such modes may include Dell EMC™ SRDF® operating in synchronous mode, asynchronous mode, adaptive copy mode, and possibly other supported modes some of which are described herein. Generally, the different replication modes address different service level requirements and determine, for example, how R1 devices are remotely mirrored across the replication links, how I/Os are processed, when the host receives acknowledgment of a write operation relative to when the write is replicated, and when writes or updates are sent to R2 partner devices.

In at least one embodiment, a primary replication mode may be configured for each RDF device pairing where the primary mode may be synchronous, asynchronous or possibly another supported replication mode. In addition to have an associated primary replication mode, an RDF device pairing may also be configured to have a secondary mode of adaptive copy. Adaptive copy mode moves large amounts of data quickly with minimal host impact. Adaptive copy mode does not provide restartable data images at the secondary site until no new writes are sent to the R1 device and all data has finished copying to the R2. Adaptive copy mode may be specified for a new RDF pairing, for example, as one way to synchronize the data of the R2 device with the data of the R1 device, or to migrate data of the R1 device to its corresponding R2 device in another system. When the synchronization or migration is complete, the mode of the RDF pairing reverts to the configured primary replication mode, such as synchronous or asynchronous. In at least one embodiment, the second mode of adaptive copy may be specified for an RDF device pairing until the R1 and R2 devices of the pairing are synchronized. Once synchronized, the RDF device pairing may revert to the configured primary mode. In at least one embodiment in connection with R1-R2 device synchronization, a maximum skew or difference may be specified indicating, for example, a number of data tracks or data potions that are not yet copied or synchronized from the R1 to the R2 device. The maximum number of tracks that the R2 can be out of synchronization with adaptive copy mode may be a default value that is equal to the entire logical device.

For the RDF device pairing in the adaptive copy mode, if the maximum skew value is exceeded, RDF starts the synchronization process to transfer updates from the R1 to the R2 devices. When the adaptive copy mode is specified as a secondary replication mode for an RDF device pairing having a primary replication mode of synchronous, the R1 device reverts to the synchronous replication mode for data transfer when the maximum skew value is reached and remains in the synchronous replication mode until the number of tracks out of synchronization is lower than the maximum skew.

To further illustrate primary replication modes in connection with Dell EMC™ SRDF®, the host may issue a write to an R1 device in a first data storage system and the data change is propagated to the R2 device in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Remote data replication may be performed in a synchronous manner or mode, such as using Dell EMC™ SRDF® operating in a synchronous mode (Dell EMC™ SRDF®/S). With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in the synchronous mode, such as Dell EMC™ SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including WP data as mentioned elsewhere herein. The write data may be propagated across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation. In at least one embodiment, asynchronous replication such as with respect to a defined R1-R2 device pairing places the host writes to the R1 device into 'cycles' or 'chunks' and then transfers an entire chunk of writes to the target system for storing in the paired R2 device.

When initially commencing remote replication for an RDF device pairing having an associated primary replication mode of synchronous or asynchronous, the RDF device pairing may be configured in adaptive copy mode in order to initially synchronize the R1-R2 devices. Subsequent to synchronizing the data of the paired R1 and R2 devices, the mode may revert to the configured primary replication of synchronous or asynchronous.

Figure 4:
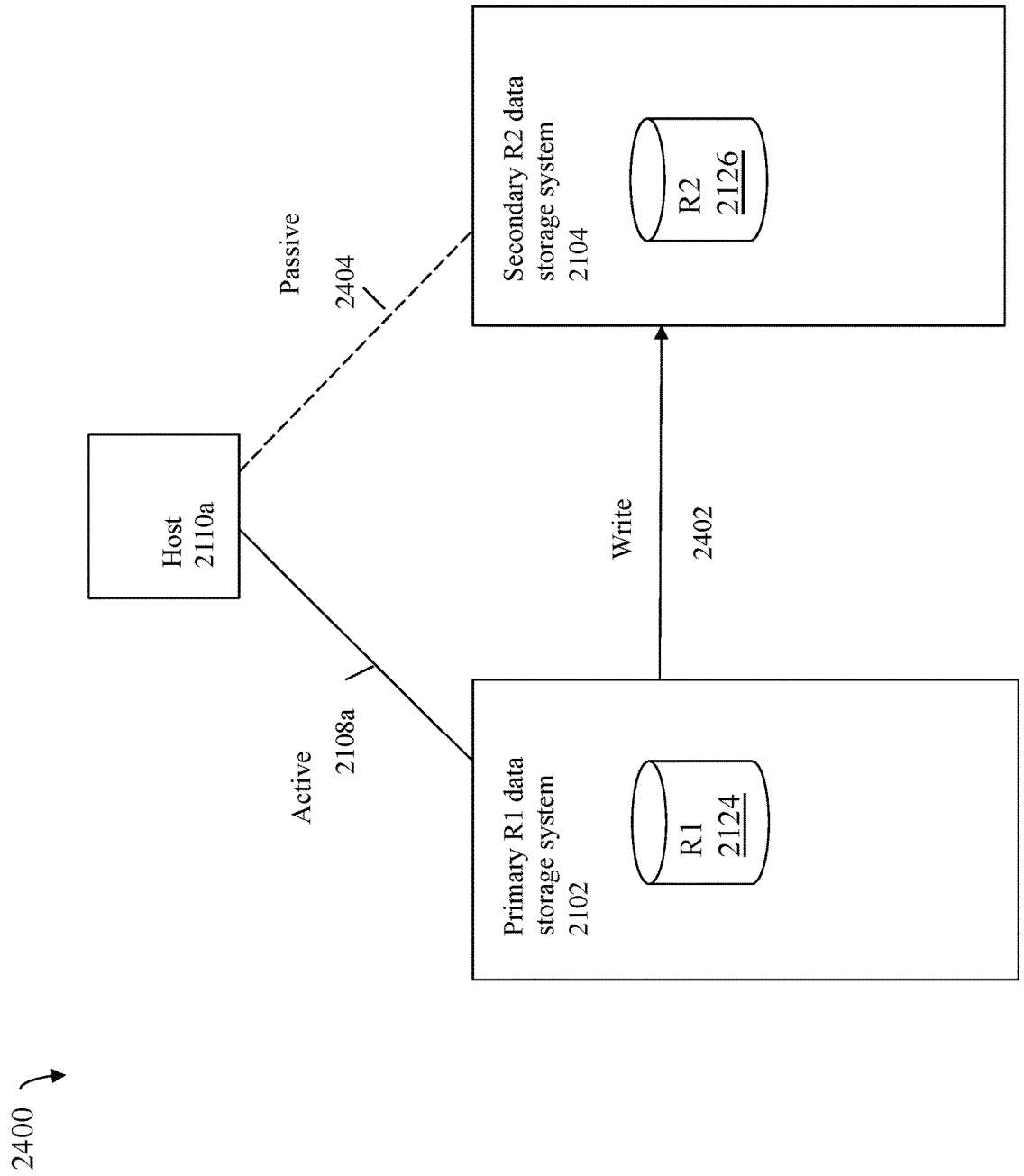

With reference to FIG. 4, shown is a further simplified illustration of components that may be used in an embodiment in accordance with the techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name or identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

It should be noted although only a single RDF link 2402 is illustrated, more generally any number of RDF links may be used in connection with replicating data from systems 2102 to system 2104 in connection with techniques herein.

Consistent with discussion herein, rather than have a single RDF device pairing of R1 2124 and R2 2126 in a replication group in connection with FIG. 4, multiple RDF device pairings may be defined and included in the same replication group.

Figure 5:
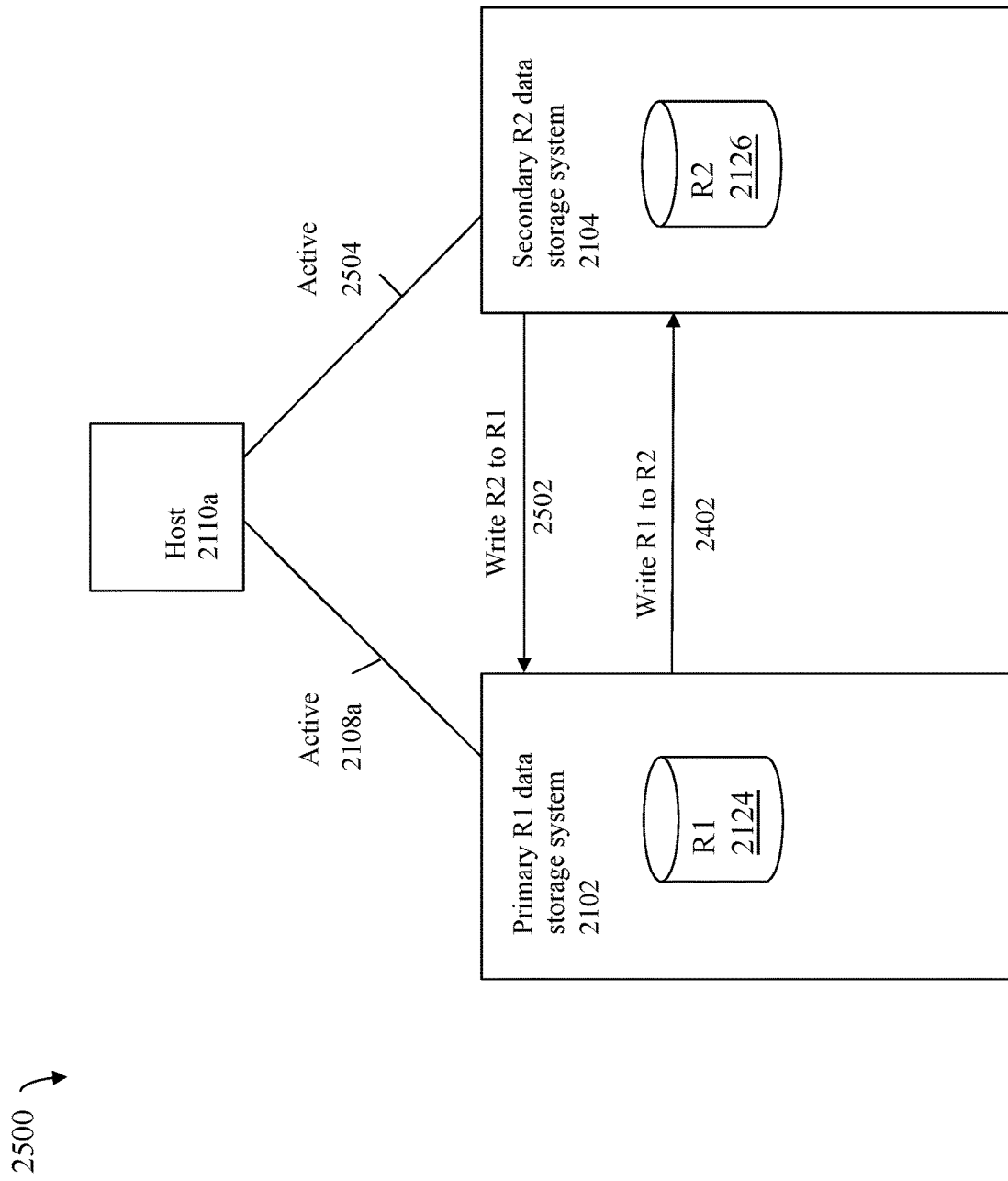

Referring to FIG. 5, shown is another example configuration of components that may be used in an embodiment in accordance with the techniques herein. The example 2500 illustrates an active-active configuration as may be used in connection with synchronous replication in at least one embodiment in accordance with the techniques herein. In an active-active configuration with synchronous replication, the host 2110*a* may have a first active path 2108*a* to the R1 data storage system and R1 device 2124 configured as LUN A. Additionally, the host 2110*a* may have a second active path 2504 to the R2 data storage system and R2 device 2126 configured as LUN A. From the view of the host 2110*a*, paths 2108*a* and 2504 appear as 2 paths to the same LUN A as described in connection with FIG. 4 with the difference that the host in the example 2500 configuration may issue I/Os, both reads and/or writes, over both of paths 2108*a* and 2504. The host 2110*a* may send a first write over path 2108*a* which is received by the R1 system 2102 and written to cache of the R1 system 2102 where, at a later point in time, the first write is destaged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110*a* over path 2108*a* that the first write has completed.

The host 2110*a* may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110*a* over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108*a* to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108*a* is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 5 has the R2 system 2104 act as another primary data storage system which facilitates propagation of writes received at the data storage system 2104 to the data storage system 2102. It should be noted that although FIG. 5 illustrates for simplicity a single host accessing both the R1 device 2124 and R2 device 2126, any number of hosts may access one or both of the R1 device 2124 and the R2 device 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with the techniques herein, the Fibre Channel (FC) protocol may be used in connection with communications (e.g., over the SAN including the RDF links) between the data storage system 2102 and 2104.

Consistent with discussion herein, rather than have a single RDF device pairing of R1 2124 and R2 2126 in a first replication group in the FIG. 5, multiple RDF device pairings may be defined and included in the same first replication group. Also rather than have a single RDF device pairing of in a second replication group where the device 2126 acts as the primary or R1 device and the device 2124 acts as the secondary or R2 device for facilitating replication of writes such as denoted by 2502, multiple RDF device pairings may be defined and included in the same second replication group.

In at least one embodiment, the active-active remote replication configuration of FIG. 5 where the R1 device 2124 and the R2 device 2126 are configured as the same LUN or logical device from the host 2110 may be exposed to a user as having an active replication mode. Thus in at least one embodiment, supported and defined replication modes may include synchronous, asynchronous, adaptive copy and active. The active replication mode may be implemented as illustrated in the FIG. 5 using the two way configured synchronous remote replication.

Figure 6:
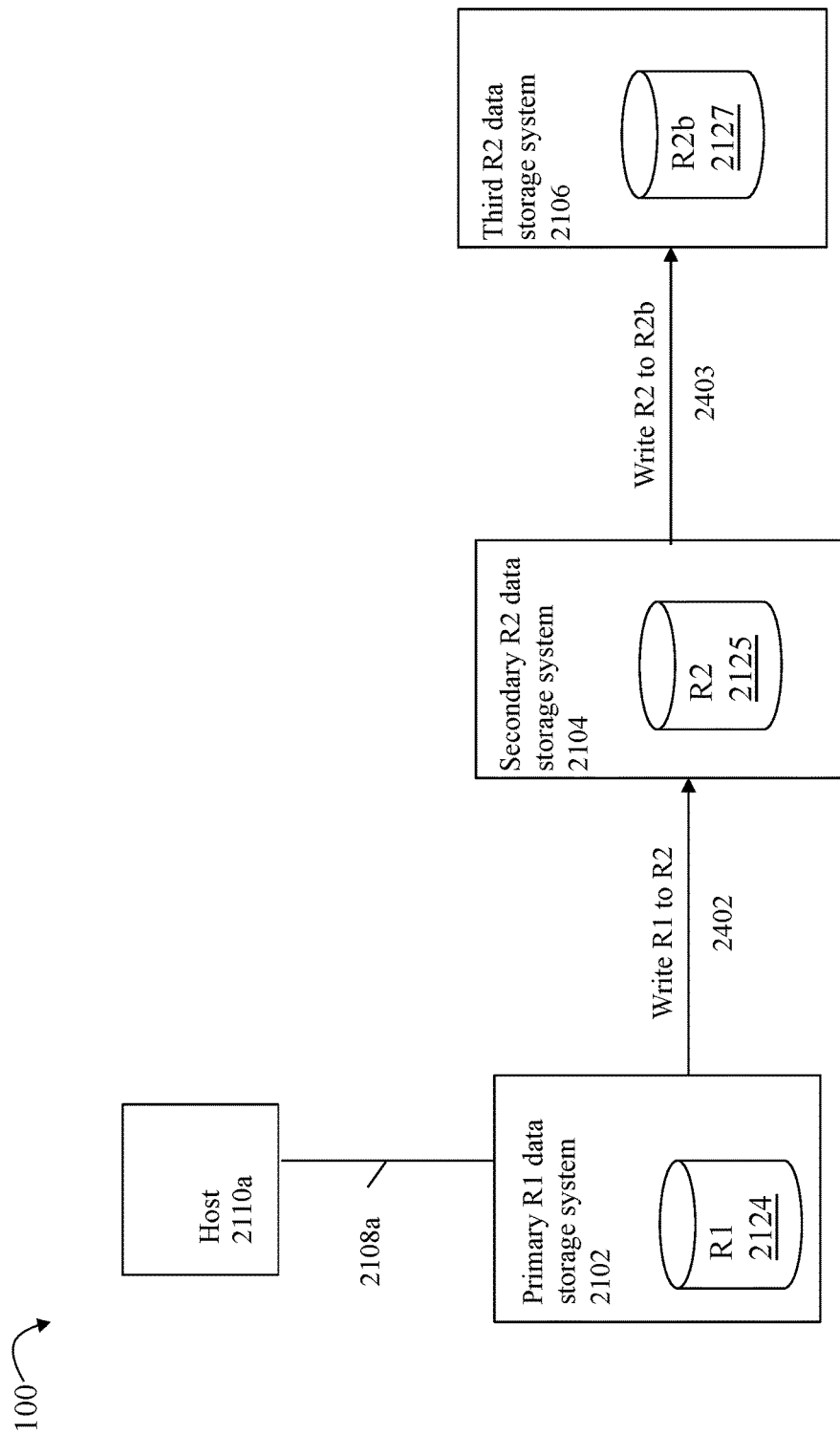

Referring to FIG. 6, shown is an example 100 of a cascaded arrangement of data storage systems used in connection with remote replication in an embodiment in accordance with the techniques herein. The example 100 includes the host 2110a, the data storage systems 2102, 2104, and the connections or links 2108a, 2402 as described above. A first RDF device pairing may be defined to include R1 2124 and R2 2125. Additionally, this example 100 includes a third R2 data storage system 2106 and a third device R2b 2127. The example 100 also includes a second RDF device pairing defined to include the devices R2 2125 and R2b 2127 where writes to the device R2 2125 are automatically replicated over the RDF link 2403 to the device R2b 2127.

The arrangement of FIG. 6 illustrates 3 sites or data storage systems involving 2 legs or hops between data storage systems, where data of the device R1 2124 is automatically replicated to the device R2 2125, and whereby data of the device R2 2125 is also automatically replicated to the device R2b 2127. More generally, the cascaded arrangement may include more than 3 data storage systems forming a chain in which data writes are cascaded or propagated from the first data storage system in the chain (e.g., 2102) to the last data storage system in the chain (e.g., 2106). RDF device pairings may be defined between each pair of consecutive data storage systems of the chain in order to facilitate automatically replicating data through the chain of data storage systems and devices.

The configured replication mode for each of the RDF device pairings may vary depending on embodiment. For example, in at least one embodiment in connection with FIG. 6, the first RDF device pairing of R1 2124 and R2 2125 may be configured for synchronous replication, and the second RDF device pairing of R2 2125 and R2b 2127 may be configured for asynchronous replication. As a variation, both RDF device pairings may be configured for the same replication mode, such as both configured for synchronous replication or asynchronous replication. Other variations are possible depending on the supported modes and embodiment.

Consistent with discussion herein, rather than have a single RDF device pairing of R1 2124 and R2 2125 in a first replication group in the FIG. 6, multiple RDF device pairings may be defined and included in the same first replication group. Also rather than have a single RDF device pairing of R2 2125 and R2b 2127 in a second replication group 2, multiple RDF device pairings may be defined and included in the same second replication group.

Figure 7:
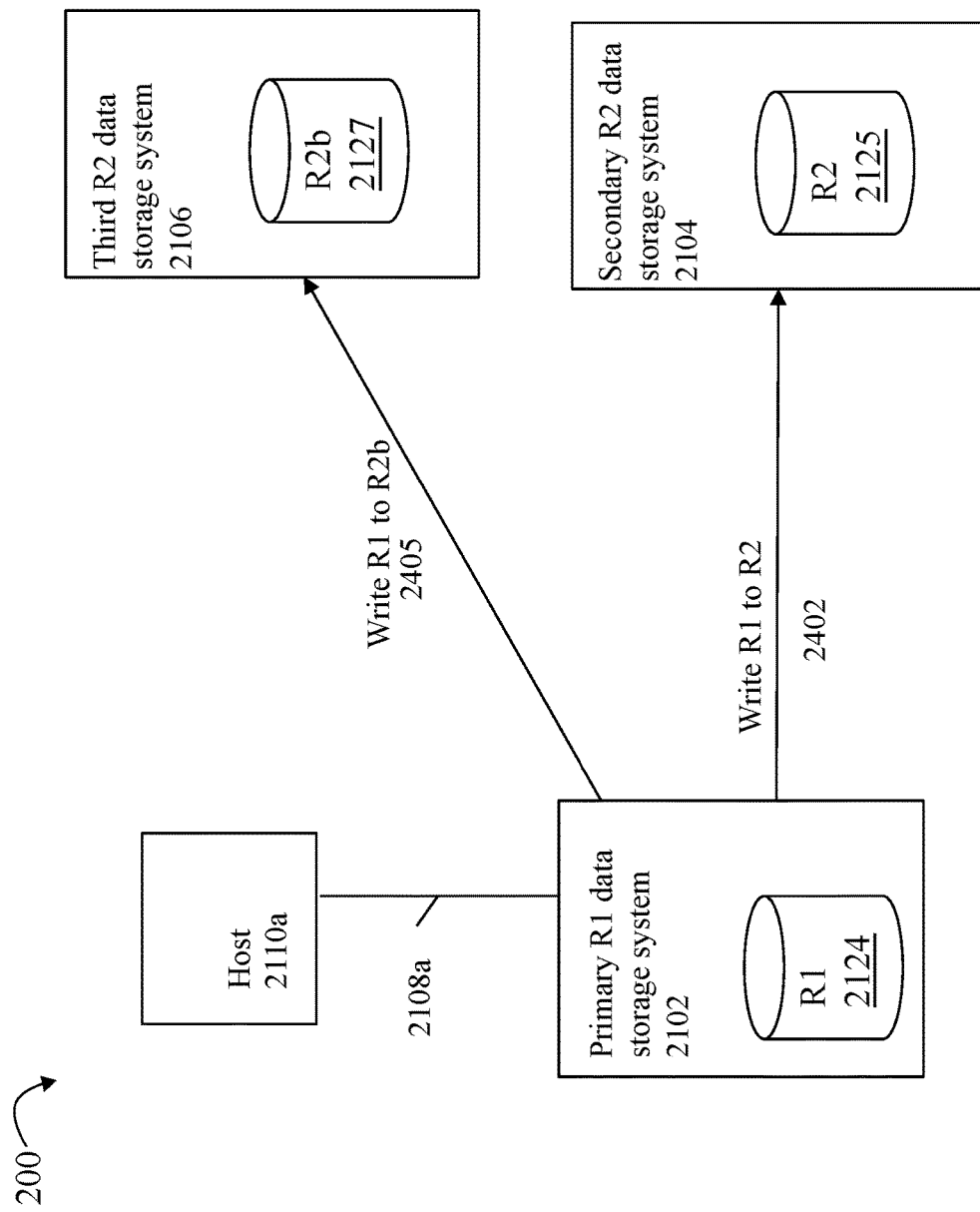

Referring to FIG. 7, shown is an example 200 of a concurrent arrangement of data storage systems used in connection with remote replication in an embodiment in accordance with the techniques herein. The example 200 illustrates another three-site or data storage system disaster recovery solution involving 2 legs or hops between systems where the device R1 2124 of the R1 system 2102 is mirrored concurrently to the two devices R2b 2127 and R2 2125.

The example 200 includes the host 2110a, the data storage systems 2102, 2104, and the connections or links 2108a, 2402 as described above. A first RDF device pairing may be defined to include R1 2124 and R2 2125 as described above. Additionally, this example 100 includes a third R2 data storage system 2106 and a third device R2b 2127. The example 200 also includes a second RDF device pairing defined to include the devices R1 2124 and R2b 2127 where writes to the device R1 2124 are automatically replicated over the RDF link 2405 to the device R2b 2127.

The arrangement of FIG. 7 illustrates 3 sites or data storage systems where data of the device R1 2124 is automatically replicated concurrently to both the devices R2 2125 and R2b 2127 on the 2 legs or hops. More generally, the arrangement may include more than 3 data storage systems where data of the primary R1 device 2124 is replicated to more than two R2 devices, with an RDF device pairing defined between the R1 device 2124 and each of the R2 devices. The R2 devices may each be in a different data storage system. More generally, a single data storage system may include any number of the R2 devices. For example, the devices R2 2125 and R2b 2127 may both be in the same single data storage system.

Consistent with discussion herein, rather than have a single RDF device pairing of R1 2124 and R2 2125 in a first replication group in the FIG. 7, multiple RDF device pairings may be defined and included in the same first replication group. Also rather than have a single RDF device pairing of R1 2124 and R2b 2127 in a second replication group 2, multiple RDF device pairings may be defined and included in the same second replication group.

The configured replication mode for each of the RDF device pairings may vary depending on embodiment. For example, in at least one embodiment, the first RDF device pairing of R1 2124 and R2 2125 of the FIG. 7 may be configured for synchronous replication, and the second RDF device pairing of R1 2124 and R2b 2127 may be configured for asynchronous replication. As a variation, both RDF device pairings may be configured for the same replication mode, such as both configured for synchronous replication or asynchronous replication. Other variations are possible depending on the supported modes and embodiment.

Figure 8:
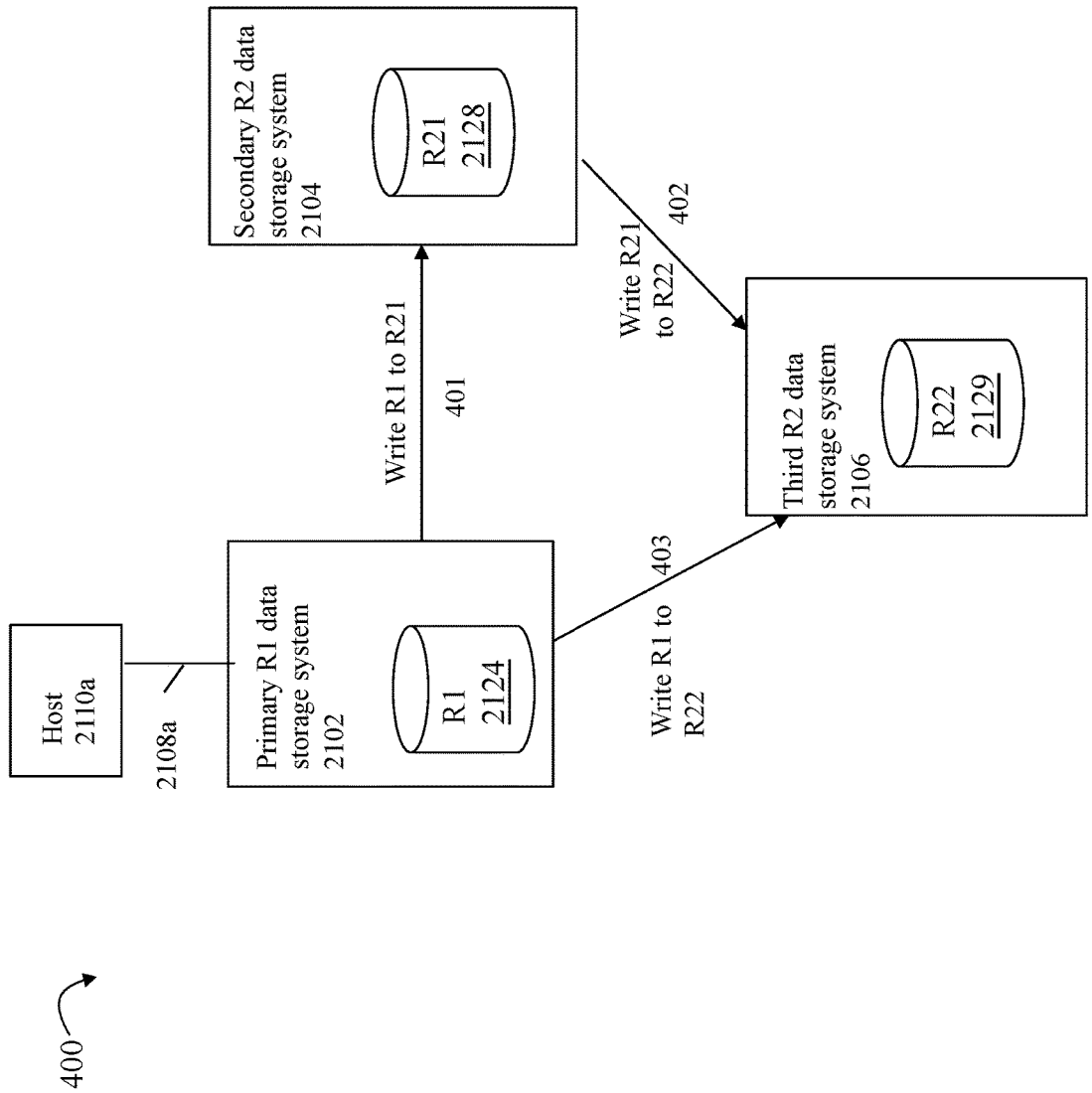

Referring to FIG. 8, shown is an example 400 of a triangular arrangement of data storage systems used in connection with remote replication in an embodiment in accordance with the techniques herein. The example 400 illustrates another three-site or data storage system disaster recovery solution involving 3 legs or hops between data storage systems. The device R1 2124 of the R1 system 2102 is mirrored concurrently to the two devices R22 2129 and R21 2128. Additionally the device R21 2128 is mirrored to the device R22 2129.

The example 200 includes the host 2110a; the data storage systems 2102, 2104, 2106; and the RDF connections or links 401 402 and 403. A first replication group may include the first RDF device pairing of R1 2124 and R21 2128 configured for synchronous replication where the link 401 is used to replicate writes of R1 2124 to R21 2128. A second replication group may include the second RDF device pairing of R21 2128 and R22 2129 configured for asynchronous replication where the link 402 is used to replicate writes of R21 2128 to R22 2129. A third replication group may include the third RDF device pairing of R1 2124 and R22 2129 configured for asynchronous replication where the link 403 is used to replicate writes of R1 2124 to R22 2129.

The arrangement of FIG. 8 illustrates 3 sites or data storage systems with 3 hops or legs using the links 401, 402 and 403. In connection with the example 400, the device R22 2129 is configured as a target R2 device of two RDF device pairings. With the triangular configuration in at least one embodiment, the device R22 2129 may actively receive writes from only one of the two configured RDF device pairings, where either writes over the link 403 for the RDF device pairing R1 2124-R22 2129 is suspended, or writes over the link 402 for the RDF device pairing R21 2128-R22 2129 is suspended. For example, suppose the writes over the link 402 for the RDF device pairing R21 2128-R22 2129 are suspended. In this case, if the primary system 2102 and the device R1 2124 experience a disaster and are inaccessible to the host 2110a, the host 2110a may alternatively access the data on of R21 2128 on the system 2104. Writes over the link 402 may be active using the defined RDF device pairing R21 2128-R22 2129.

Generally, the foregoing FIGS. 3, 4, 5, 6, 7 and 8 illustrate different remote replication topologies. Additional topologies are possible such as based on various supported extensions and combinations of those described above. For example, an embodiment may support additional 3 site or data storage system topologies and configuration as well as various 4 site or data storage system topologies and configurations.

The configurations and topologies such as illustrated in the FIGS. 3 and 4 may be characterized in one aspect as single hop replication configurations with single replica legs between two data storage systems. The configurations and topologies such as illustrated in the FIGS. 5, 6, 7 and 8 are examples of multi-hop or multiple hop replication configurations including multiple replica legs. For example, FIG. 6 is a daisy chained or cascaded arrangement that includes a first replication hop or leg from the systems 2102 to 2104, and a second replication hop or log from the systems 2104 to 2106. FIG. 7 is a concurrent arrangement that includes a first replication hop or leg from the systems 2102 to 2104, and a second replication hop or log from the systems 2102 to 2106. FIG. 8 is a triangular arrangement of 3 systems or sites with 3 replication hops or legs—a first replication hop or leg from the systems 2102 to 2104, a second replication hop or leg from the systems 2104 to 2106 and a third replication hop or leg from the systems 2102 to 2106.

In at least one embodiment in accordance with the techniques herein, a replication group may be defined for each leg or hop in the remote replication configuration. For example, with reference to FIG. 6 which is a multi-hop remote replication configuration, a first replication group may be defined with respect to the RDF device pairings between the systems 2102 and 2104, and a second replication group may be defined with respect to the RDF device pairings between the systems 2104 and 2106. With reference to FIG. 7 which is a multi-hop remote replication configuration, a first replication group may be defined with respect to the RDF device pairings between the systems 2102 and 2104, and a second replication group may be defined with respect to the RDF device pairings between the systems 2102 and 2106.

In at least one embodiment, a replication group may generally include one or more SGs, where the replication group may be specified in connection with a remote replication leg or hop having any supported replication mode. In at least one embodiment, one typical application or usage may define a replication group in connection with a synchronous replication mode for a leg or hop where the replication group may include multiple SGs. In at least one embodiment, one typical application or usage may define a replication group in connection asynchronous replication mode for a leg or hop where the replication group may include only a single SG.

What will now be described is further detail regarding embodiments of the techniques herein for automated expansion and reduction of a remotely replicated data set.

As an example, consider a data set with the LUNs A1, B1 and C1, where the LUNs A1, B1 and C1 are included in the storage group SG1 on a primary data storage system. In at least one embodiment in accordance with the techniques herein, a property may be maintained that any LUN in an SG is fully protected by remote replication. Thus, prior to adding a new LUN to an existing SG, the new LUN may first be protected through established remote replication. In connection with the storage group SG1 in this example, full protection with remote replication may be provided with reference to a simple configuration or topology as in FIG. 3. The storage group SG1 may be defined on the system 2102. On the remote or secondary data storage system 2104, a second storage group SG2 may be defined that includes the LUNs A2, B2 and C2. The RDF device pairings may be the LUNs A1-A2, the LUNs B1-B2, and the LUNs C1-C2. The replication group G1 may be the RDF device pairings of the LUNs A1-A2, LUNs B1-B2, and LUNs C1-C2. Now assume a user wants to expand the data set to add LUNs D1 and E1 to the storage group SG1 on the system 2102. The techniques herein may be used to automatically configure and establish remote replication of the LUNs D1 and E1 as well as automatically add the LUNs D1 and E1 to the existing storage group SG1. In more detail, the LUN D2 may be configured on the system 2104 as the counterpart R2 device for the R1 device, LUN D1, where the techniques herein define a new RDF device pairing of the LUNs D1-D2, determine and set a replication mode for the new RDF device pairing, add the new RDF device pairing to the replication group G1, add the LUN D1 to the storage group SG1, and add the LUN D2 to the storage group SG2. Additionally, the LUN E2 may be configured on the system 2104 as the counterpart R2 device for the R1 device, LUN E1, where the techniques herein define a new RDF device pairing of the LUNs E1-E2, determine and set a replication mode for the new RDF device pairing, add the new RDF device pairing to the replication group G1, add the new RDF device pairing to the replication group G1, add the LUN E1 to the storage group SG1, and add the LUN E2 to the storage group SG2.

In at least one embodiment, the processing steps to expand the data set to add the LUNs D1 and E1, and provide for remote replication and full protection of the data set, may be performed in a particular sequence in order to maintain the above-noted property. Additionally, performing the steps in a particular sequence also facilitates actions taken responsive to a failure to successfully complete expansion and full protection of the data set using remote replication. For example, processing may be performed in a first step to provision storage for the LUNs D1, E1, D2 and E2. Subsequent to the first step to provision storage for the LUNs D1, E1, D2 and E2, processing may be performed in a second step to configure and establish remote replication between the LUNs D1 and D2 and also between the LUNs E1 and E2. The remote replication configuration steps performed may include configuring the LUNs D1 and D2 as a new RDF device pairing and possibly other steps needed in order to perform remote data replications between the LUNs D1 and D2. The remote replication configuration steps performed may include configuring the LUNs E1 and E2 as another new RDF device pairing and possibly other steps needed in order to perform remote data replications between the LUNs E1 and E2. Subsequent to performing the second step for the LUNs D1, D2, E1 and E2, a third step may be performed to add the LUNs D1 and D2 to the storage group SG1 and to add the LUNs D2 and E2 to the storage group SG2.

In at least one embodiment in accordance with the techniques herein, existing RDF device pairings of a replication group may be used as a template for new RDF device pairings created for the added LUNs where the new RDF device pairings are added to the replication group.

In at least one embodiment in accordance with the techniques herein, the property that any LUN in an SG is fully protected by remote replication may be maintained in connection with reducing an existing data set. Thus, the LUN and its remote replica may first be removed from their existing SGs prior to performing other processing in connection with the techniques herein. For example, assume the storage group SG1 includes the LUNs A1, B1 and C1 with full protection with remote replication provided with reference to a simple configuration or topology as in FIG. 3. The storage group SG1 may be defined on the system 2102. On the remote or secondary data storage system 2104, a second storage group SG2 may be defined that includes the LUNs A2, B2 and C2. The RDF device pairings may be the LUNs A1-A2, the LUNs B1-B2, and the LUNs C1-C2. The replication group G1 may be the RDF device pairings of the LUNs A1-A2, LUNs B1-B2, and LUNs C1-C2. Now assume a user wants to reduce the data set to remove LUN C1 from SG1 on the system 2102. The techniques herein may be used to automatically reduce the data set of the storage group SG1.

In at least one embodiment, the processing steps to reduce the existing data set to remove the LUN C1 from the data set, and thus from the storage group SG1, may be performed in a particular sequence in order to maintain the above-noted property. Additionally, performing the steps in a particular sequence also facilitates actions taken responsive to a failure to successfully complete expansion and full protection of the data set using remote replication. For example, processing may be performed in a first step to remove the LUN D1 from the storage group SG1 and to remove the LUN D2 from the storage group SG2. Subsequent to the first step to remove the LUNs D1 and D2 from their respective storage groups, SG1 and SG2, processing may be performed in a second step to suspend any existing remote replication transfers between the LUNs C1 and C2. Subsequent to the second step regarding the LUNs C1 and C2, a third step may be performed to remove the remote replication relationship between the LUNs C1 and C2. The third step may include removing the configured remote replication relationship such as removing the RDF device pairing of the LUNs C1-C2 from a replication group, as well as possibly other steps.

What will now be described is more detail regarding expanding and reducing an application data set in an embodiment in accordance with the techniques herein. In the following example, assume there is an existing data set as described above with the storage group SG1 including the LUNs A1, B1 and C1, where the LUNs A1, B1 and C1 are on a primary data storage system. Assume further with the storage group SG1 in this example, full protection with remote replication may be provided with reference to a simple configuration or topology as in FIG. 3. The storage group SG1 may be defined on the system 2102. On the remote or secondary data storage system 2104, the second storage group SG2 may be defined that includes the LUNs A2, B2 and C2. The RDF device pairings may be the LUNs A1-A2, the LUNs B1-B2, and the LUNs C1-C2. The replication group G1 may be the RDF device pairings of the LUNs A1-A2, LUNs B1-B2, and LUNs C1-C2. Now also assume as noted above that a user wants to expand the data set to add the LUNs D1 and E1 to the storage group SG1 on the system 2102.

It should be noted that when creating the necessary replication configuration in connection with automated expansion or reduction of the application data set, such as an SG, commands may be issued to the data storage systems in the current remote replication configuration. Such commands may be issued directly or indirectly to a particular data storage system. For example, reference is made to FIG. 6. As part of creating or modifying the replication configuration described elsewhere herein, processing may include issuing a command directly to the primary data storage system 2102, such as using a management console or other suitable means. It may also be necessary to issue commands to other remote data storage systems such as the system 2106, for example, where a direct connection to the system 2106 is not available. In some embodiment, the commands may be issued indirectly to the system 2106 through one or more other data storage systems. For example, a multi-hop command may be issued indirectly to the system 2106 through the systems 2102 and 2104. In this case, a user may initiate the multi-hop command request at the system 2102. In turn, the system 2102 communicates the multi-hop command request to the system 2104, where the system 2104 subsequently sends the multi-hop command request to the system 2106.

In at least one embodiment, a request to expand the data set may be made by a user issuing a request, such as from a GUI, command line, API (application programming interface), or other interface. The request may be a management command issued over the control path or management path. The request may identify the storage group on the primary data storage system, such as SG1. The request may also identity the number of LUNs to be added and the size of each such added LUN. Responsive to receiving the request to expand the data set, an embodiment in accordance with the techniques herein may perform the processing described below.

As a first step S1 in connection with expanding the data set, processing may be performed to determine whether the existing data set is currently fully protected by remote replication. If not, then the automated expansion processing of the techniques herein is not supported and is not performed.

The first step S1 of ensuring or verifying that the existing data set is fully protected may include multiple steps or checks performed with respect to each leg or hop of the remote replication.

The step S1 may include the step S1a which verifies that all LUNs of the existing data set, SG1, are remotely replicated and that the LUNs of the storage group SG1 and their associated remote replicas are in the same replication group. In this example, the existing data set is the storage group SG1 including the LUNs A1, B1 and C1. The step S1a determines that all the LUNs A1, B1 and C1 of the storage group SG1 are configured for remote replication. The step S1a also determines that the LUNs A1, B1 and C1 and their respective remote R2 replicas, LUNs A2, B2 and C2, are in the same replication group G1. It should be noted that at this point, details regarding the remote replication configuration have yet not been further evaluated, and are further evaluated in subsequent processing. If the step S1a verification fails where all LUNs in the data set, and thus SG1, are not configured for remote replication, and where all LUNs of SG1 and their respective R2 remote replicas are not in the same replication group, processing of the techniques herein may not be supported and may stop.

Subsequent to performing the step S1a, the step S1 may include performing the step S1b which verifies that all the RDF device pairings of the replication group are in the same appropriate replication pair state. The replication pair state with respect to each RDF device pairing may be characterized in one aspect as denoting the current state of the data transfer with respect to the R1 and R2 devices of the RDF device pairing. The replication pair states may vary with the supported remote replication modes and configurations as well as other aspects of an embodiment. Thus, the particular replication pair states considered as valid and appropriate in order to perform the techniques herein may also vary with the supported replication modes and configurations of an embodiment.

In at least one embodiment with supported replication modes including synchronous, asynchronous and adaptive copy, valid and appropriate replication pair states for performing the techniques herein may include: synchronized, consistent, synchronization in progress, suspended and split. Synchronized or consistent may both denote that the data of the R1 and R2 devices are synchronized and mirror one another. In one embodiment "synchronized" may denote that the data of the R1 and R2 device of the pair are synchronized and the configured replication mode is synchronous; and "consistent" may denote that the data of the R1 and R2 device of the pair are synchronized and the configured replication mode is asynchronous. Synchronization in progress may denote that the data synchronization of the R1 and R2 devices is in progress whereby there are existing invalid tracks between the R1 and R2 devices, and the associated RDF links used for data transfer in the synchronization are up. Suspended and split may both denote valid states of paused or no data transfer between the R1 and R2 devices. Suspended may indicate that the RDF link(s) used for the R1-R2 pair have been suspended and are not ready or are write disabled. The R1 is ready while the links are suspended, any I/O accumulates as invalid tracks owed to the R2. With a state of split, the R1 and the R2 are currently ready to their hosts but the link(s) used for data transfers between the R1 and the R2 are not ready or are write disabled.

In at least one embodiment with supported replication modes including synchronous, asynchronous, adaptive copy and additionally including active (e.g., as described in connection with FIG. 5), the valid and appropriate replication pair states for performing the techniques herein may include: synchronized, consistent, synchronization in progress, and suspended and split, as noted above. Additionally, the valid and appropriate replication states may include one or more additional states associated with the active replication mode. For example in such an embodiment, the valid replication pair states for performing the techniques herein may also include active-bias and active-witness. Both active-bias and active witness replication pair states for an RDF device pairing indicate that the configured replication mode is active and the initial data synchronization between the R1 and R2 of the pairing has completed. The active-bias replication pair state further indicates processing performed if the RDF device pairing is not ready due to failure of the RDF link(s) used for remote replication of the R1 and R2 devices in the active configuration of FIG. 5. In this case, remote replication is unable to be performed to keep the R1 and R2 devices of the active-active configuration synchronized. Responsive to the failure of the RDF link(s) used for the RDF device pairing, only one of the R1 and R2 devices remains accessible to the host and other external clients. In at least one embodiment, the bias attribute may be associated with only one of the R1 and R2 devices of the pairing, where the device of the pairing with the bias attribute remains accessible to the host and the other device of the pairing becomes inaccessible to the host.

The active-witness replication state further indicates processing performed using a witness option if the RDF device pairing is not ready due to failure of the RDF link(s) used for remote replication of the R1 and R2 devices in the active configuration of FIG. 5. Generally a third party, the witness, is another system or facility that facilitates deciding which one of the R1 and R2 devices of the pairing that remains accessible to the external clients, and which becomes inaccessible to the external clients.

In at least one embodiment, any other replication pair state than as noted above may be considered invalid or unsuitable for performing the techniques herein. Generally, such other replication pair states considered invalid or unsuitable may denote unhealthy or invalid current conditions related to the R1 and R2 devices, the RDF link used between the pair for remote replication, the data storage systems, and the like. For example, in at least one embodiment, another possible replication pair state is "partition" denoting that the local R1 device and system are unable to communicate, respectively, with the remote R2 device and system. Thus, the step S1b may include determining that all RDF device pairings of the replication group are in one of the acceptable valid replication pair states, and then subsequently that all RDF device pairings of the replication group are in the same such acceptable valid replication pair state. In connection with the example above with the storage groups SG1 and SG2 and the replication group G1, processing may determine that the replication group G1 includes the 3 RDF device pairings of LUNs A1-LUN A2, LUNs B1-LUN B2 and LUNs C1-LUN C2, where all 3 RDF device pairings are in the same one of the valid replication pair states, such as all 3 RDF pairings are in the synchronized state, or all 3 RDF pairings are in the consistent state. If the step S1b verification fails where all the RDF device pairings of the replication group are not in the same valid replication pair state, processing of the techniques herein may not be supported and may stop.

Subsequent to performing the step S1b, the step S1 may include performing the step S1c which verifies that the replication group connecting the data storage systems is online and that the remote data storage system is visible. The step S1c may determine the replication group is online and that the remote data storage system is visible by determining each of the R1 and R2 devices of the replication group are online and ready for use, determining that the one or more RDF links (e.g., used for remote replication between the R1 and R2 devices of the RDF device pairings of the replication group) are healthy and functioning, and determining that each of the R1 devices of the replication group is able to communicate with its respectively paired remote R2 device. If the step S1c verification fails where all the RDF device pairings of the replication group are not in the same valid replication pair state, processing of the techniques herein may not be supported and may stop.

It should be noted that in at least one embodiment, a replication group may be determined as online when there is at least one network path, such as one link used for remote replication, from one data storage system to the remote data storage system for the replication group. Otherwise the replication group may be considered as offline. The replication group may generally have two or more paths or links used for remote replication for purposes of redundancy. If none of the paths is functioning and able to be used for transmitting data between the two systems, then there's no communication of data for remote replication between the two systems whereby the replication group may be considered offline, rather than online.

Subsequent to performing the step S1c, the step S1 may include performing the step S1d which determines whether each RDF device pairing in the replication group is configured to have the same replication mode. In at least one embodiment, this may be a replication mode that is one of adaptive copy, active, synchronous or asynchronous, all of which are described elsewhere herein in more detail. In connection with the example for the replication group G1, processing may determine whether the 3 RDF device pairings LUN A1-LUN A2, LUN B1-LUN B2 and LUN C1-LUN C2 are configured to have the same replication mode (e.g., either all synchronous, all asynchronous, all adaptive copy or all active). If the step S1c evaluates to false where all the RDF device pairings of the replication group are not determined to have the same replication mode, processing of the techniques herein may not be supported and may stop.

The particular allowable combinations of replication modes and replication pair states may vary with embodiment.

In connection with a multi-hop remote replication configuration, the step S1 may be performed independently with respect to each leg or hop in the configuration. It should be noted that such analysis in connection with the step S1 may conclude that each hop is valid even though the various hops may have different attributes such as different replication modes. For example, reference is made to FIG. 6 illustrating a remote replication configuration with two replication hops or legs. An embodiment may have a first replication group defined in connection with the systems 2102 and 2104 with RDF device pairings configured for synchronous remote replication, where all such RDF device pairings have a replication pair state of synchronized; and a second replication group defined in connection with the systems 2104 and 2106 with RDF device pairings configured for asynchronous remote replication, where all such RDF device pairings have a replication pair state of consistent. The foregoing two hop remote replication configuration may be successfully verified by the step S1 processing, where the step S1 processing may be performed a first time with respect to a first replication leg or hop between the systems 2102 and 2104, and where the S1 processing may also be performed a second time with respect to a second replication leg or hop between the systems 2104 and 2106. Thus, each hop or leg may have a different replication mode, as well as other properties, so long as each hop or leg is independently verified in the step S1. For an application data set to be fully protected in a multi-hop configuration, the step S1 successfully verifies each hop thereof as fully protected by successful verification by the substeps S1a, S1b, S1c and S1d.

Subsequent to performing the step S1 and successfully verifying that the current data set is fully protected for all one or more hops, a second step S2 in connection with expanding the data set may be performed. The step S2 may include performing processing to analyze the configuration and topology of the remote data replication in accordance with the supported remote replication configurations. The step S2 processing is generally determining analysis information used in the subsequent step S3 to orchestrate the replication setup for the data set expansion, such as, for example, to configure remote replication for the LUNs D1 and E1 being added to the source SG1 in the example described above.

The step S2 may include a step S2a which examines the topology of the remote replication to determine the number of replication hops or legs. Additionally, the replication groups including the RDF device pairings for each replication leg or hop between data storage systems are identified. With reference to the example described above with the replication group G1 with the 3 RDF device pairings (e.g., LUNs A1-A2; LUNs B1-B2; and LUNs C1-C2) and the storage groups SG1 and SG2 in a configuration as illustrated in FIG. 3, a single hop and single replication group is identified. As a variation, assume a configuration as illustrated in FIG. 6. In this case, the step S2a may determine a cascaded topology with multiple hops including a first replication group that defines the RDF device pairings between the primary system 2102 and the secondary system 2104, and a second replication group that defines the RDF device pairings between the system 2104 (as the primary system) and the system 2106 (as the secondary system). As a variation, assume a configuration as illustrated in FIG. 7. In this case, the step S2a may determine a concurrent topology with multiple hops including a first replication group that defines the RDF device pairings between the primary system 2102 and the secondary system 2104, and a second replication group that defines the RDF device pairings between the system 2102 (as the primary system) and the system 2106 (as the secondary system).

Subsequent to performing the step S2a, the step S2 may include performing a step S2b which determines the one or more remote SGs used on the one or more remote data storage system of the one or more replication hops or legs, where the one or more remote SGs correspond to a source SG currently being expanded on the source or primary site. Each hop or leg of the remote replication may include a remote data storage system which includes a remote SG corresponding to the source SG. With reference to the example above, consider a configuration as illustrated in FIG. 3 with the primary system 2102 with the LUNs A1, B1 and C1 included in the storage group SG1. The secondary system 2104 includes the LUNs A2, B2 and C2 included in the storage group SG2. The replication group G1 includes the RDF device pairings of SG1 and SG2 as follows: LUNs A1-A2; LUNs B1-B2; and LUNs C1-C2. In this case, the step S2a identifies a single hop configuration with a topology as in FIG. 3 using the replication group G1. The step S2b identifies the remote SG, SG2 configured as the corresponding remote storage group for the source storage group SG1, where SG1 is being expanded to add LUN D and LUN E.

The step S2 processing may generally be performed for each hop or leg of the analyzed replication topology and configuration to identify the remote SGs of the remote data storage systems corresponding to the source SG being expanded. For example, with reference to FIG. 6, the step S2 processing may identify 2 remote SGs corresponding to a source SG on the primary system 2102. A first remote SG may be identified in the system 2104 and a second remote SG may be identified in the system 2106.

It should be noted that the source SG and its corresponding remote SG may be configured to only include the LUNs of the existing RDF device pairings of the replication group G.

Subsequent to completing the step S2, the step S3 may be performed to orchestrate the replication setup and configure remote replication for the data set expansion, such as for the remote replication of the LUNs D1 and E1 being added to the source storage group SG1. The step S3 generally uses the analysis information regarding the identified topology and the remote SGs (identified in the step S2) in order to know where to add corresponding counterpart devices and RDF device pairings in the existing topology for each LUN added to the source SG.

The step S3 may include the step S3a where processing is performed to locate an existing replica or partner R2 device on the remote system for each LUN being added as a new R1 device to the source SG1. Continuing with the example above with expanding SG1 to add the new LUNs D1 and E1 to a single hop configuration as illustrated in the FIG. 3, LUN D1 is being added to the source SG1 of the system 2102 with the candidate RDF device pairing of the LUNs D1-D2; and LUN E1 is being added to the source SG1 of the system 2102 with the candidate RDF device pairing of the LUNs E1-E2. Each of the source LUNs D1 and E1 being added has one or more properties that must also match their associated replica or R2 devices. For example, the corresponding replica devices, the LUNs D2 and E2, may be configured with the same size or capacity as well as other attributes or properties matching those of their corresponding primary R1 devices, the LUNs D1 and E1. In this case, the step S3a obtains corresponding replica or R2 device candidates on the system 2104 that may be used as the LUNs D2 and E2 having the desired attributes or properties. In some cases, the replica or R2 device candidates with the desired properties may already be created and provisioned on the remote secondary R2 system 2104. If the step S3a determines that the corresponding replica devices do not already exist in the remote secondary R2 system 2104, processing may be performed to create and provision the replica devices, the LUNs D2 and E2, with the desired properties in the system 2104.

Subsequent to performing the step S3a, the step S3 may also include performing the step S3b where, for each candidate RDF device pairing, a new RDF device pairing is added to the replication group G1 of the replication leg or hop. In this example, the step S3b includes adding the two new RDF device pairings for the LUNs D1-D2 and the LUNs E1-E2 to the replication group G1. Each of the new RDF device pairings is configured to have a replication mode matching the other RDF device pairings in the replication group G1. For example, assume that the existing 3 RDF device pairings of the replication group G1 are configured for synchronous replication mode, then the two new RDF device pairings are similarly configured for the synchronous replication mode. Additionally, the two new RDF device pairings are created to having a replication pair state matching the other existing RDF device pairings of the replication group. For example, if the other existing RDF device pairings of the replication group have a replication pair state of suspended, then the 2 new RDF device pairings also have the state of suspended. As another example, if the other existing RDF device pairings of the replication group have a replication mode of asynchronous and a replication pair state of consistent, processing may be performed to begin synchronizing the R1-R2 devices of the 2 new RDF device pairings to eventually achieve the consistent synchronized replication pair state. It should be noted that depending on the replication mode, additional parameters may be used to create the new RDF device pairings.

It should be noted that the information obtained from the remote replication configuration analysis performed from the prior step S2a may be used in connection with the step S3b. For example, the replication mode and the replication pair state of the existing RDF device pairings in the replication group G1 may be included in the information obtained from performing the step S2a, where the replication mode and the replication pair state may then be used in configuring the new RDF device pairings for the LUNs D1-D2 and the LUNs E1-E2. The replication pair state of the existing RDF device pairings in the replication group G1 may be used, for example, to determine whether or not to perform initial data synchronization of the R1 and R2 devices of the new RDF device pairings. For example, if the replication pair state is suspended, the initial data synchronization may not be performed for the new RDF device pairings. Alternatively, if the replication pair state is, for example, any one of consistent, synchronized, active-bias or active-witness, the initial data synchronization of the R1 and R2 device of the new RDF device pairings may be performed. The particular replication group associated with a remote replication hop or leg may be identified in the step S2a, and the new RDF device pairings created in the step S3b may be added to the particular replication group. Other attributes or properties regarding the existing replication configuration, such as the direction of the data transfer between the storage systems and devices of the replication hop, may also be derived from the analysis performed in the step S2a. Such attributes may then be specified in connection with configuring remote replication for the newly added RDF device pairings of the replication group associated with the replication hop.

Subsequent to performing the step S3b, the step S3 may also include performing the step S3c where, for each new RDF device pairing that includes an R1-R2 device pair added to the replication group G1 of the replication leg or hop, the R1 device of the pair is added to the source storage group SG1 of the system 2102, and the R2 device of the pair is added to the corresponding storage group SG2 of the remote or secondary R2 system 2104. The particular storage group constructs used in the step S3c may be those identified in the prior step S2b.

In at least one embodiment, when adding a new RDF device pairing to a replication group and the new RDF device pairing is configured with the asynchronous replication mode, an exempt flag may be set for the new RDF device pairing. When the new RDF device pairing is created and configured for asynchronous replication, processing may be performed to initially synchronize the data or content of the R1 and R2 devices of the pairing. While this device data synchronization of the R1 and R2 devices is in progress, the replication pair status for the new RDF device pair is synchronization in progress. Additionally, while this data synchronization is in progress, the exempt flag is set indicating that the RDF device pairing is newly created and is exempt or excluded from the step S1b replication state processing whereby all RDF device pairings of the replication group have to have the same replication pair state. If the exempt flag is set for an RDF device pairing denoting that the foregoing synchronization of the R1 and R2 devices of the pairing is in progress, the replication pair state of the RDF device pairing marked as exempt is omitted from the step S1b verification processing. Once the synchronization of the R1 and R2 devices of the RDF device pairing configured with the asynchronous replication mode has completed, the associated replication pair state of the RDF device pairing is updated to consistent and the exempt flag may be removed, cleared or turned off whereby the replication pair state of the RDF device pairing will now be considered when subsequently performing the step S1b.

In at least one embodiment also supporting the active replication mode and configuration as illustrated and described in connection with FIG. 5, a new RDF device pairing configured for the active replication mode may be created, and processing may be performed to initially synchronize data of the R1-R2 devices of the pair. Additionally, for the new RDF device pairing undergoing data synchronization, the exempt flag may be set to exempt the replication pair set of the RDF device pairing from the rules of the processing of the techniques herein, such as in connection with the step S1b. Also while the R1-R2 data synchronization is in progress, the replication pair state for the R1-R2 RDF device pairing may be synchronization in progress. Once the R1-R2 device synchronization of the pairing has completed, the associated replication pair state may be updated to a suitable state, such as active-bias, denoting the completed R1-R2 data synchronization state, and the exempt flag may be removed, cleared or turned off whereby the replication pair state of the RDF device pairing will now be considered when subsequently performing the step S1b.

In at least one embodiment, it should be noted that an initial R1-R2 device data synchronization may also be performed in connection with a newly configured RDF device pairing configured generally in any one or more other replication modes, such as, for example, configured for the synchronous replication mode. In at least one embodiment, the new RDF device pairing may be created and included in a replication group. The replication pair state of the newly created RDF pairing may be suspended. Subsequently, the data transfer or replication between the R1-R2 devices may be established over an RDF link and the replication pair state may transition from suspended to synchronization in progress. During the initial R1-R2 data synchronization, the replication pair state for the associated RDF device pairing may be synchronization in progress. Once the initial data synchronization has completed for the R1-R2 devices of the pairing, the replication pair state may transition from the replication pair state of synchronization in progress to a next state, where the next state denotes completion of the initial data synchronization of the R1-R2 RDF device pairing for the particular configured replication mode. For example, if the RDF device pairing has an associated replication mode of asynchronous, the next state may be consistent; and if the RDF pairing has an associated replication mode of active, the next state may be active-bias or active-witness.

The processing described above in connection with the step S3 may be performed for each leg or hop of the replication. For example, in the cascaded configuration as in FIG. 6, the processing of the step S3 may be performed for the first hop or leg between the systems 2102 to 2104 and also performed for the second hop or leg between the systems 2104 to 2106. In connection with the triangular configuration as in FIG. 8, the processing of the step S3 may be performed for the first hop or leg from the systems 2102 to 2104, for the second hop or leg from the systems 2104 to 2106, and also for the third hop or leg from the systems 2102 to 2106.

The steps S1, S2 and S3 described above may be performed in connection with expanding a data set such as by adding one or more LUNs to an SG of a source system, such as an SG on the primary data storage system 2102 of the FIG. 3. In at least one embodiment, the processing of the steps S1, S2 and S3 may be performed in sequential order to facilitate actions taken responsive to a failure to successfully complete the data set expansion with full protection of the newly added LUNs using remote replication. In at least one embodiment, if the foregoing processing of the steps S1, S2 and S3 when expanding a data set by adding one or more LUNs to a source SG fails to complete successfully, actions may be performed to place the data storage systems, the replication group and associated SGs in the same state as prior to commencing the processing of the steps S1, S2 and S3. For example, assume that the step S1 completes successfully. Subsequently the step S2 is performed where the LUN D1 is created on the primary system 2102 and the LUN D2 is created on the secondary system 2104. However, an error occurs in the step S2 processing when creating and adding a new RDF device pairing for the LUNs D1-D2 to the replication group G. In this case, processing performed responsive to the error may include deleting the LUN D1 from the system 2102 and deleting the LUN D2 from the system 2104 in order to roll back the state of the data storage systems and undo any of the processing performed in the steps S1 and S2 up to the point of the error.

What will now be described is more detail regarding reducing an application data set in an embodiment in accordance with the techniques herein. In the following example, assume as above that there is an existing data set with the storage group SG1 including the LUNs A1, B1 and C1, where the LUNs A1, B1 and C1 on a primary data storage system. Assume further with the storage group SG1 in this example, full protection with remote replication may be provided with reference to a simple configuration or topology as in FIG. 3. The storage group SG1 may be defined on the system 2102. On the remote or secondary data storage system 2104, the second storage group SG2 may be defined that includes the LUNs A2, B2 and C2. The RDF device pairings may be the LUNs A1-A2, the LUNs B1-B2, and the LUNs C1-C2. The replication group G1 may be the 3 RDF device pairings of the LUNs A1-A2, LUNs B1-B2, and LUNs C1-C2. Now assume that a user wants to reduce the data set to remove the LUN C1 from the storage group SG1 on the system 2102.

In at least one embodiment, a request to reduce the data set may be made by a user issuing a request, such as from a GUI, command line, API or other interface. The request may be a management command issued over the control path or management path. The request may identify the storage group on the primary data storage system, such as the storage group SG1. The request may also identity the particular one or more LUNs of the storage group SG1 to be removed. Responsive to receiving the request to reduce the data set, an embodiment in accordance with the techniques herein may perform the processing described below.

As a first step S11 in connection with reducing the data set, processing may be performed to determine whether the existing data is currently fully protected by remote replication. If not, then the automated reduction processing of the techniques herein is not supported and is not performed.

The first step S11 of ensuring or verifying that the existing data set is fully protected may include multiple steps or checks performed with respect to each leg or hop of the remote replication. In at least one embodiment, the step S11 may perform processing similar to that as described elsewhere herein in the step S1 for expansion processing with the difference that failure to successfully complete verification processing of any of the steps S1a, S1b, S1C and S1d results in terminating processing to reduce the data set using the techniques herein (rather than terminating processing to expand the data set using the techniques herein).

Subsequent to successfully completing the verification of the first step S11 that the existing data set is fully protected for all one or more hops, processing of the second step S12 may be performed in connection with reducing the data set. The step S12 may include performing processing to analyze the configuration and topology of the remote data replication in accordance with the supported remote replication configurations. The step S12 may include performing processing similar to that as described above in the step S2 for expansion processing. The step S12 processing is generally determining analysis information used in the subsequent step S13 to orchestrate the replication processing for the data set reduction. Consistent with discussion above, the step S2 and thus S12 determines analysis information including identifying the replication group used for each hop or leg of the replication configuration and determining the one or more remote SGs used on the remote data storage systems, where the one or more remote SGs correspond to the source SG being reduced on the primary data storage system.

Subsequent to completing the step S12, the step S13 may be performed. The step S13 may include a step S13a where processing determines the one or more RDF device pairings to be removed from the replication group G1. The step S13a may include identifying the RDF device pairing in the replication group G1, where the identified RDF device pairing includes the LUN C1 being removed. For example, the replication group G1 includes the identified RDF device pairing for the LUNs C1-C2, where the LUN C1 is located in the primary system 2102 and the corresponding replica LUN C2 is located in the secondary system 2104. The step S13a may use the replication group identified in the prior step S12a as being associated with a particular replication hop or leg.

Subsequent to completing the step S13a, the step S13 may also include performing the step S13b where the LUNs of the one or more identified RDF device pairing are removed from their respective SGs. In this example, the RDF device pairing includes the LUNs C1-C2, where the LUN C1 is removed from the source storage group SG1 of the system 2102, and the LUN C2 is removed from the corresponding remote storage group SG2 of the system 2104. The step S13b may use the storage groups identified in the prior step S12b.

Subsequent to completing the step S13b, the step S13 may include performing a step S13c. In the step S13c, if any of the identified RDF device pairings still has data transferring between the R1 and R2 device of the pairing, a suspend action may be performed to stop the data transfer.

Subsequent to complete the step S13c, the step S13 may include performing a step S13d. In the step S13d, for each RDF device pairing identified in the step S13a, delete the identified RDF device pairing from the replication group. For example, the RDF device pairing for the LUNs C1-C2 is removed from the replication group G1. In connection with the step S13d, depending on the replication mode, additional parameters may be used in connection with removing the desired RDF device pairing from the replication group. In at least one embodiment in which there are multiple hops or legs of the replication configuration, the step S13d may first be performed with respect to the one or more identified RDF pairings including a LUN from the source SG.

The processing described above in connection with the step S13 may be performed for each leg or hop of the replication. For example, in the cascaded configuration as in FIG. 6, the processing of the step S13 may be performed for the first hop or leg from the systems 2102 to 2104 and also performed for the second hop or leg from the systems 2104 to 2106. In connection with the triangular configuration as in FIG. 8, the processing of the step S13 may be performed for the first hop or leg from the systems 2102 to 2104, for the second hop or leg from the systems 2104 to 2106, and also for the third hop or leg from the systems 2102 to 2106.

Figure 9:
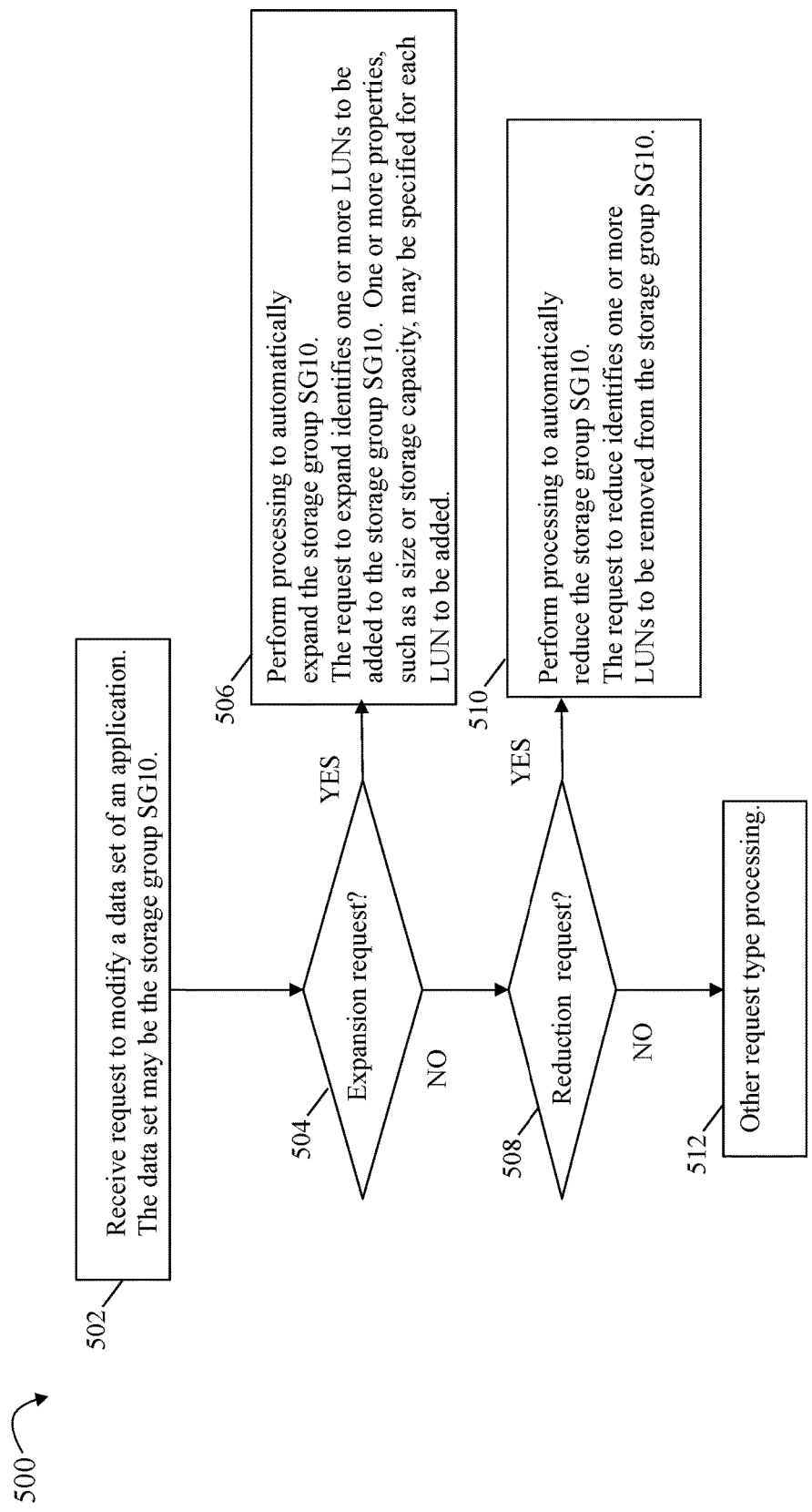
FIGS. 9, 10 and 11 are flowcharts of processing steps that may be performed in an embodiment in accordance with the techniques herein.
Figure 10:
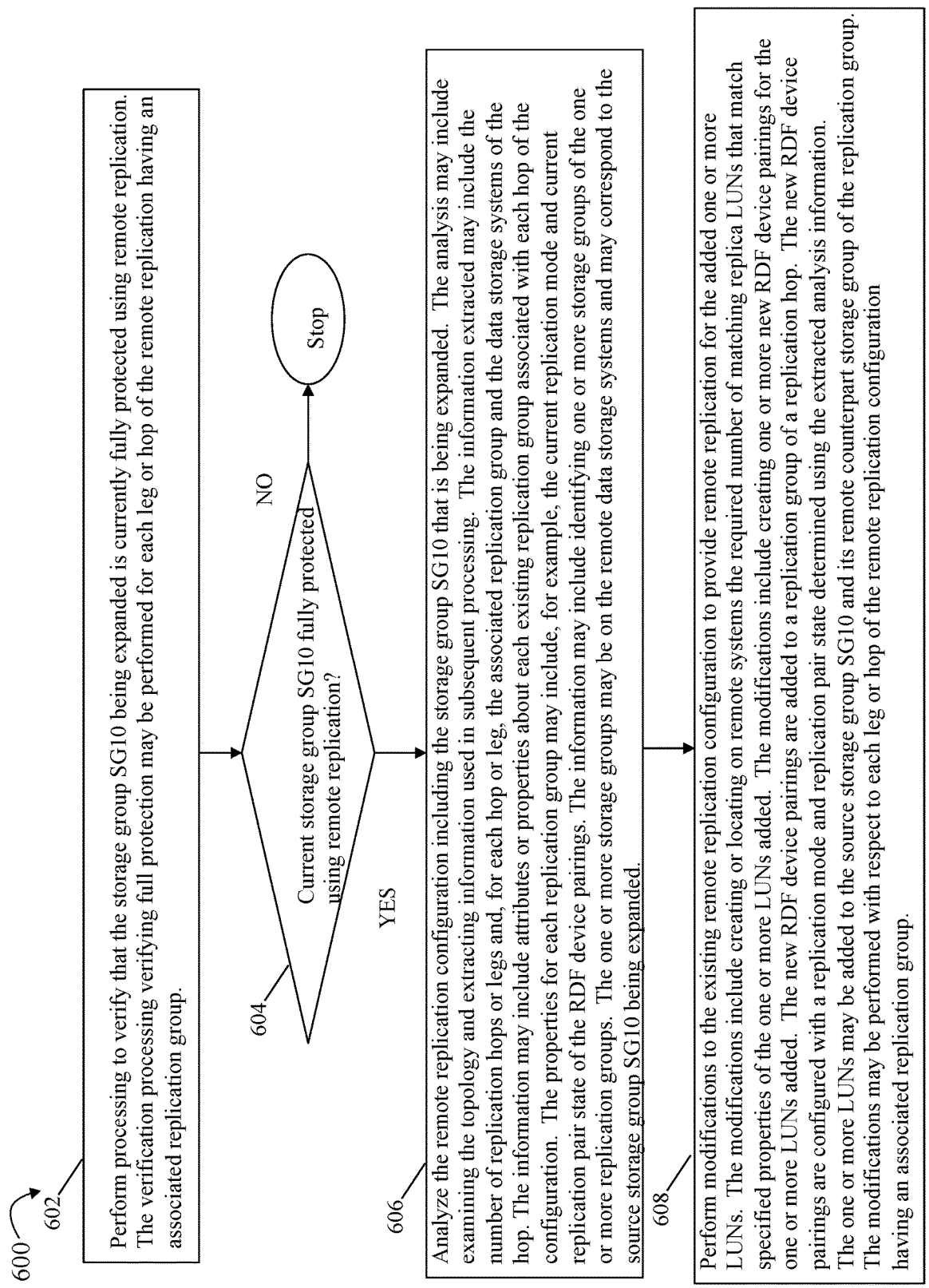
Figure 11:
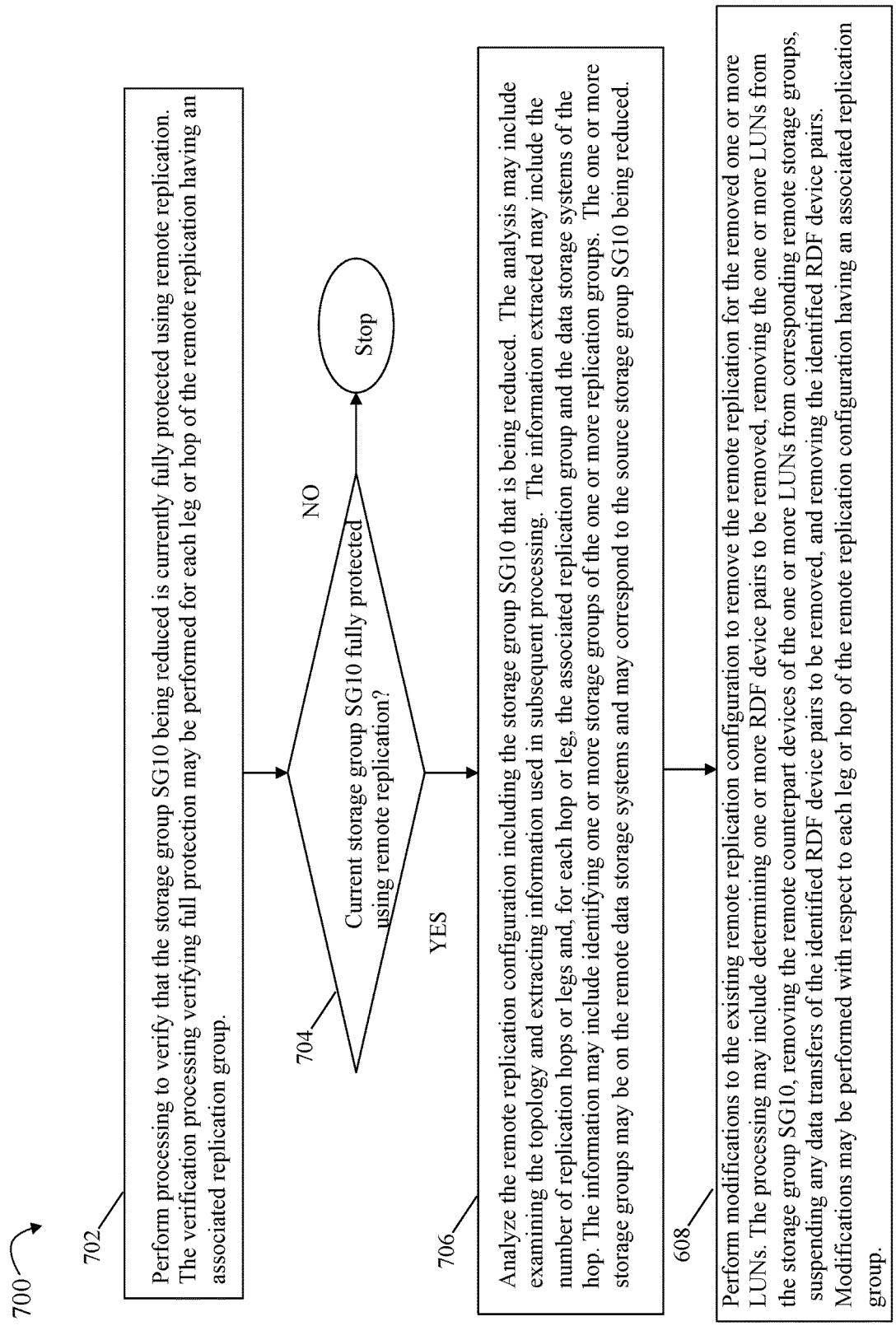

What will now be described in connection with the FIGS. 9, 10 and 11 are flowcharts of processing steps that may be performed in an embodiment in accordance with the techniques herein. The flowcharts of the FIGS. 9, 10 and 11 summarize processing described above.

Referring to FIG. 9, shown is a first flowchart 500 of processing steps that may be performed in an embodiment in accordance with the techniques herein. At the step 502, a request may be received, such as from a user, to modify an existing data set of an application. The existing data set may be a storage group denoted in this example as SG10. From the step 502, processing proceeds to the step 504.

At the step 504, processing determined whether the request is an expansion request to expand the storage group SG10 where one or more LUNs are to be added to the storage group SG10. If the step 504 evaluates to yes, control proceeds to the step 506. At the step 506, processing is performed to automatically expand the storage group SG10 and add the one or more LUNs identified in the request to the storage group SG10. In at least one embodiment, the request may identify the storage group SG10 to be expanded, the number of LUNs to be added to the storage group SG10, and a size or storage capacity for each LUN to be added. More generally, the request may specify one or more properties including the size or storage capacity for each LUN to be added to the storage group SG10.

If the step 504 evaluates to no, control proceeds to the step 508. At the step 508, processing is performed to determine whether the request is a reduction request to remove one or more LUNs from the storage group SG10. If the step 508 evaluates to yes, control proceeds to the step 510. At the step 510, processing is performed to automatically reduce the storage group SG10 and remove the one or more LUNs identified in the request from the storage group SG10. In at least one embodiment, the request may identify the storage group SG10 to be reduced. If the step 508 evaluates to no, control proceeds to the step 512 to perform other request type processing.

Referring to FIG. 10, shown is a second flowchart 600 of processing steps that may be performed in an embodiment in accordance with the techniques herein. The flowchart 600 provides more detailed steps that may be performed in connection with automatically expanding the storage group for the step 506 of FIG. 9.

At the step 602, processing may be performed to verify that the storage group SG10 being expanded is currently fully protected using remote replication. The verification processing of the step 602 verifying full protection may be performed for each leg or hop of the remote replication having an associated replication group. The processing of the step 602 to verify full protection of the storage group SG10 may include determining whether all LUNs of the storage group SG10 are remotely replicated and included in the same replication group G11. The processing of the step 602 may include determining whether all LUNs of the storage group SG10 are included in RDF device pairings of the replication group G11, where the RDF device pairings have the same replication pair state. The processing of the step 602 may include determining whether the RDF device pairings of the replication group G11 are online and that the remote data storage system is visible. From the step 602, control proceeds to the step 604.

At the step 604, a determination is made as to whether the processing of the step 602 has determined that the storage group SG10 is fully protected using remote replication. If the step 604 evaluates to no, processing stops. If the step 604 evaluates to yes, control proceeds to the step 606.

At the step 606, processing may be performed to analyze the remote replication configuration including the storage group SG10 that is being expanded. The analysis may include examining the topology and extracting information used in subsequent processing of the step 608. The information extracted may include the number of replication hops or legs and, for each hop or leg, the associated replication group and the data storage systems of the hop. The information may include attributes or properties about each existing replication group associated with each hop of the configuration. The properties for each replication group may include, for example, the current replication mode and current replication pair state of the RDF device pairings. The information may include identifying one or more storage groups of the one or more replication groups. The one or more storage groups may be on the remote data storage systems and may correspond to the source storage group SG10 being expanded. From the step 606, control proceeds to the step 608.

At the step 608, modifications to the existing remote replication configuration may be performed to provide remote replication for the added one or more LUNs. The modifications may include creating or locating on remote systems the required number of matching replica LUNs that match specified properties of the one or more LUNs added. The specified properties may include, for example, the size or capacity of each added LUN as included in the expansion request. The modifications may include creating one or more new RDF device pairings for the one or more LUNs added. The new RDF device pairings are added to a replication group of a replication hop. The new RDF device pairings are configured with a replication mode and replication pair state determined using the extracted analysis information. The one or more LUNs may be added to the source storage group SG10 and its remote counterpart storage group of the replication group. The modifications may be performed with respect to each leg or hop of the remote replication configuration having an associated replication group.

Referring to FIG. 11, shown is a third flowchart 700 of processing steps that may be performed in an embodiment in accordance with the techniques herein. The flowchart 700 provides more detailed steps that may be performed in connection with automatically reducing the storage group for the step 510 of FIG. 9.

The processing performed in the steps 702 and 704 may be respectively similar the steps 602 and 604 of the FIG. 10. At the step 702, processing may be performed to verify that the storage group SG10 being reduced is currently fully protected using remote replication. The verification processing of the step 702 verifying full protection may be performed for each leg or hop of the remote replication having an associated replication group. The processing of the step 702 to verify full protection of the storage group SG10 may include determining whether all LUNs of the storage group SG10 are remotely replicated and included in the same replication group G11. The processing of the step 702 may include determining whether all LUNs of the storage group SG10 are included in RDF device pairings of the replication group G11, where the RDF device pairings have the same replication pair state. The processing of the step 702 may include determining whether the RDF device pairings of the replication group G11 are online and that the remote data storage system is visible. From the step 702, control proceeds to the step 704.

At the step 704, a determination is made as to whether the processing of the step 702 has determined that the storage group SG10 is fully protected using remote replication. If the step 704 evaluates to no, processing stops. If the step 704 evaluates to yes, control proceeds to the step 706.

The processing performed for the step 706 may be similar to the processing performed in connection with the step 606. The step 706 may perform processing to analyze the remote replication configuration including the storage group SG10 that is being reduced. The analysis may include examining the topology and extracting information used in subsequent processing of the step 708. The information extracted may include the number of replication hops or legs and, for each hop or leg, the associated replication group and the data storage systems of the hop. The information may include identifying one or more storage groups of the one or more replication groups. The one or more storage groups may be on the remote data storage systems and may correspond to the source storage group SG10 being reduced. From the step 706, control proceeds to the step 708.

At the step 708, modifications may be made to the existing remote replication configuration to remove the remote replication for the one or more LUNs removed from the storage group SG10. The processing may include determining one or more RDF device pairs to be removed, removing the one or more LUNs from the storage group SG10, removing the remote counterpart devices of the one or more LUNs from corresponding remote storage groups, suspending any data transfers of the identified RDF device pairs to be removed, and removing the identified RDF device pairs. The processing of the step 708 may include performing necessary modifications with respect to each leg or hop of the remote replication configuration having an associated replication group corresponding to the storage group SG10.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of modifying an application data set comprising:
   receiving a request to modify a storage group of one or more logical devices used by an application; and
   performing first processing that modifies, in accordance with the request, the storage group and an existing remote replication configuration, wherein the first processing includes:
      verifying that the one or more logical devices of the storage group are protected by remote replication performed in accordance with the existing remote replication configuration;
      analyzing the existing remote replication configuration and generating analysis information;
      performing, in accordance with the analysis information and the request, a first modification to the existing remote replication configuration; and
      performing, in accordance with the request, a second modification to the storage group, wherein the storage group is included in a first data storage system and the existing remote replication configuration is used in connection with remotely replicating the one or more logical devices of the storage group to a second data storage system including a second storage group of one or more other logical devices, wherein the storage group and the second storage group are included in a first replication group, wherein the first replication group includes one or more remote replication device pairs each including one logical device from the storage group and a corresponding logical device from the second storage group, and wherein the corresponding logical device of the second storage group of the second data storage system is configured as a remote replica of the one logical device of the storage group of the first data storage system.

2. The method of claim 1, wherein the request specifies to add a first logical device to the storage group.

3. The method of claim 2, wherein said analyzing determines a first replication mode and a first replication pair state of the one or more remote replication device pairs of the first replication group, wherein the first modification includes configuring a new remote replication device pair of the first replication group for the first logical device, and wherein the new remote replication device pair is configured to have the first replication mode and the first replication pair state.

4. The method of claim 3, wherein the second modification includes adding the first logical device to the storage group.

5. The method of claim 2, wherein said analyzing determines that the existing remote replication configuration includes a plurality of replication hops, where each of the plurality of replication hops denotes a remote replication configuration between two data storage systems, wherein each of the plurality of replication hops is associated with a corresponding one of a plurality of replication groups identifying remote replication devices pairs for said each replication hop, and wherein the plurality of replication hops includes a first replication hop associated with the first replication group.

6. The method of claim 5, wherein each of the plurality of replication groups identifies logical devices of one data storage system remotely replicated on corresponding logical devices of another data storage system, and wherein the first processing includes:
verifying that all logical devices of the plurality of replication groups are protected by remote replication performed in accordance with the existing remote replication configuration;
for each of the plurality of replication groups associated with one of the plurality of replication hops, determining that remote replication device pairs of the said each replication group have a same associated replication pair state; and
determining that each of the plurality of replication groups is online and that all remote data storage systems associated with the plurality of replication hops are visible to the first data storage system.

7. The method of claim 1, wherein said verifying that the one or more logical devices of the storage group are protected by remote replication performed in accordance with the existing remote replication configuration further includes: determining that all logical devices of the storage group are included in a same replication group, the first replication group; determining that all logical devices of the storage group have a same associated replication pair state; and determining that the first replication group is online and that the second data storage system is visible to the first data storage system.

8. The method of claim 1, wherein the request specifies to remove a first logical device from the storage group.

9. The method of claim 8, wherein said analyzing determines a first replication mode and a first replication pair state of the one or more remote replication device pairs of the first replication group, wherein the first modification includes removing a first remote replication device pair from the first replication group for the first logical device.

10. The method of claim 8, wherein the second modification includes removing the first logical device from the storage group.

11. A system comprising:
a processor; and
a memory comprising code stored thereon that, when executed, performs a method of modifying an application data set comprising:
receiving a request to modify a storage group of one or more logical devices used by an application; and
performing first processing that modifies, in accordance with the request, the storage group and an existing remote replication configuration, wherein the first processing includes:
verifying that the one or more logical devices of the storage group are protected by remote replication performed in accordance with the existing remote replication configuration;
analyzing the existing remote replication configuration and generating analysis information;
performing, in accordance with the analysis information and the request, a first modification to the existing remote replication configuration; and
performing, in accordance with the request, a second modification to the storage group performing, in accordance with the request, a second modification to the storage group, wherein the storage group is included in a first data storage system and the existing remote replication configuration is used in connection with remotely replicating the one or more logical devices of the storage group to a second data storage system including a second storage group of one or more other logical devices, wherein the storage group and the second storage group are included in a first replication group, wherein the first replication group includes one or more remote replication device pairs each including one logical device from the storage group and a corresponding logical device from the second storage group, and wherein the corresponding logical device of the second storage group of the second data storage system is configured as a remote replica of the one logical device of the storage group of the first data storage system.

12. A non-transitory computer readable medium comprising code stored thereon that, when executed, performs a method of modifying an application data set comprising:
receiving a request to modify a storage group of one or more logical devices used by an application; and
performing first processing that modifies, in accordance with the request, the storage group and an existing remote replication configuration, wherein the first processing includes:
verifying that the one or more logical devices of the storage group are protected by remote replication performed in accordance with the existing remote replication configuration;
analyzing the existing remote replication configuration and generating analysis information;
performing, in accordance with the analysis information and the request, a first modification to the existing remote replication configuration; and performing, in accordance with the request, a second modification to the storage group, wherein the storage group is included in a first data storage system and the existing remote replication configuration is used in connection with remotely replicating the one or more logical devices of the storage group to a second data storage system including a second storage group of one or more other logical devices, wherein the storage group and the second storage group are included in a first replication group, wherein the first replication group includes one or more remote replication device pairs each including one logical device from the storage group and a corresponding logical device from the second storage group, and wherein the corresponding logical device of the second storage group of the second data storage system is configured as a remote replica of the one logical device of the storage group of the first data storage system.

13. The non-transitory computer readable medium of claim 12, wherein the request specifies to add a first logical device to the storage group.

14. The non-transitory computer readable medium of claim 13, wherein said analyzing determines a first replication mode and a first replication pair state of the one or more remote replication device pairs of the first replication group, wherein the first modification includes configuring a new remote replication device pair of the first replication group for the first logical device, and wherein the new remote replication device pair is configured to have the first replication mode and the first replication pair state.

15. The non-transitory computer readable medium of claim 14, wherein the second modification includes adding the first logical device to the storage group.

16. The non-transitory computer readable medium of claim 12, wherein said verifying that the one or more logical devices of the storage group are protected by remote replication performed in accordance with the existing remote replication configuration further includes: determining that all logical devices of the storage group are included in a same replication group, the first replication group; determining that all logical devices of the storage group have a same associated replication pair state; and determining that the first replication group is online and that the second data storage system is visible to the first data storage system.

* * * * *